US005535261A

United States Patent [19]
Brown et al.

[11] Patent Number: 5,535,261
[45] Date of Patent: Jul. 9, 1996

[54] SELECTIVELY ACTIVATED INTEGRATED REAL-TIME RECORDING OF TELEPHONE CONVERSATIONS

[75] Inventors: Barry D. Brown, Mesquite; Paul A. J. Wakefield, Carrollton, both of Tex.

[73] Assignee: Gateway Technologies, Inc., Carrollton, Tex.

[21] Appl. No.: 109,830

[22] Filed: Aug. 20, 1993

[51] Int. Cl.⁶ .......................... H04M 3/22; H04M 1/66; H04M 3/38
[52] U.S. Cl. .......................... 379/67; 379/184; 379/194; 379/88; 379/35; 379/112; 379/114; 379/136
[58] Field of Search .................................. 379/34, 35, 88, 379/112, 113, 135, 136, 7, 284, 263, 92, 98, 67, 114, 184, 194

[56] References Cited

U.S. PATENT DOCUMENTS

| | | | |
|---|---|---|---|
| 3,851,121 | 11/1974 | Marvin | 379/35 |
| 4,559,416 | 12/1985 | Theis et al. | 379/34 |
| 4,799,255 | 1/1989 | Billinger et al. | 379/112 |
| 4,815,120 | 3/1989 | Kosich | 379/35 |
| 4,924,488 | 5/1990 | Kosich | 379/34 |
| 4,937,862 | 6/1990 | Kosich | 379/34 |
| 5,276,731 | 1/1994 | Arbel et al. | 379/88 |
| 5,319,702 | 6/1994 | Kitchin et al. | 379/114 |
| 5,335,266 | 8/1994 | Richardson, Jr. et al. | 379/88 |
| 5,351,287 | 9/1994 | Bhattacharyya et al. | 379/35 |

OTHER PUBLICATIONS

"System 20", Value Added Communications (VAC), Nov., 1992, Brochure (4 pages).
"Conquest III Inmate Telephone System", Tele–Matic Corporation, Nov. 1992, cover & pp. H1–H8.

Primary Examiner—Jeffery Hofsass
Assistant Examiner—Scott Wolinsky
Attorney, Agent, or Firm—Leo V. Novakoski

[57] ABSTRACT

A system for controlling and monitoring the recording of telephone calls in institutions such as jails and correctional facilities. Calls are recorded automatically in response to the occurrence of specific triggering events, as pre-defined under software control by a system administrator. Triggering events may include, for example, use of a specific line, attempts to use particular features (such as three-way calling), attempts to dial particular telephone numbers, or use by a particular person. Recorded calls are digitized and stored in standard MS-DOS files on either a local computer system or a remote computer across a network. Stored digitized recordings may be selected for playback under software control by a system administrator. The system of the present invention allows control of recordings from within a conventional telephone system. The integrated nature of the system provides cost savings and improved flexibility.

25 Claims, 26 Drawing Sheets

| LN | STATUS | NUMBER | ZONE | TIME | LN | STATUS | NUMBER | ZONE | TIME |
|----|--------|--------|------|------|----|--------|--------|------|------|
| 1  | GET NAME    | 2136528002 | CB C   | 0:00 | 13 | ASK NAME  | 3032458871 | CB L   | 0:00 |
| 2  | INSTRUCT    |            | CB F   | 0:00 | 14 | THANKS    |            | CB M   | 0:00 |
| 3  | ASK NAME    | 8178843420 | INF 1  | 0:00 | 15 | DIALTONE  |            | INF 2  | 0:00 |
| 4  | ASK NAME    | 2142894329 | CB B   | 0:00 | 16 | INVALID   | 7126509834 | HLDG 2 | 0:00 |
| 5  | THANKS      |            | HLDG 1 | 0:00 | 17 | INSTRUCT  |            | CB J   | 0:00 |
| 6  | THANKS      |            | CB G   | 0:00 | 18 | THANKS    |            | ISO 3  | 0:00 |
| 7  | INSTRUCT    |            | CB D   | 0:00 | 19 | ASK NAME  | 7137539724 | ISO 4  | 0:00 |
| 8  | GET NUMBER  |            | ISO 1  | 0:00 | 20 | ASK NAME  | 4172419391 | CB K   | 0:00 |
| 9  | INSTRUCT    |            | ISO 2  | 0:00 | 21 | INVALID   |            | CB N   | 0:00 |
| 10 | GET NAME    | 4126471570 | CB I   | 0:00 | 22 | ASK NAME  | 4103324564 | CB O   | 0:00 |
| 11 | INSTRUCT    |            | CB E   | 0:00 | 23 | THANKS    |            | HALL   | 0:00 |
| 12 | GET NAME    | 8178843420 | CB H   | 0:00 | 24 | ASK NAME  | 2177725972 | CB P   | 0:00 |

GATEWAY TECHNOLOGIES — COPYRIGHT 1992 — ALL RIGHTS RESERVED

09:13:23a ———————— CPS-4000 ———————— FRI 09/04/92

FIG. 3A

| LINE | CURRENT STATE | CALLS | OKAY | DENY | BAD | | LINE | CURRENT STATE | CALLS | OKAY | DENY | BAD |
|---|---|---|---|---|---|---|---|---|---|---|---|---|
| 1 | INSTRUCT | 1 | 0 | 0 | 0 | | 13 | INSTRUCT | 1 | 0 | 0 | 0 |
| 2 | GET NUMBER | 1 | 0 | 0 | 0 | | 14 | LANGUAGE | 1 | 0 | 0 | 0 |
| 3 | INSTRUCT | 1 | 0 | 0 | 0 | | 15 | LANGUAGE | 1 | 0 | 0 | 0 |
| 4 | LANGUAGE | 1 | 0 | 0 | 0 | | 16 | INSTRUCT | 1 | 0 | 0 | 0 |
| 5 | LANGUAGE | 1 | 0 | 0 | 0 | | 17 | LANGUAGE | 1 | 0 | 0 | 0 |
| 6 | INSTRUCT | 1 | 0 | 0 | 0 | | 18 | EMERG CALL | 1 | 0 | 0 | 0 |
| 7 | INSTRUCT | 1 | 0 | 0 | 0 | | 19 | THANKS | 1 | 0 | 0 | 0 |
| 8 | LANGUAGE | 1 | 0 | 0 | 0 | | 20 | LANGUAGE | 1 | 0 | 0 | 0 |
| 9 | LANGUAGE | 1 | 0 | 0 | 0 | | 21 | LANGUAGE | 1 | 0 | 0 | 0 |
| 10 | INSTRUCT | 1 | 0 | 0 | 0 | | 22 | GET NUMBER | 1 | 0 | 0 | 0 |
| 11 | LANGUAGE | 1 | 0 | 0 | 0 | | 23 | INSTRUCT | 1 | 0 | 0 | 0 |
| 12 | LANGUAGE | 1 | 0 | 0 | 0 | | 24 | INSTRUCT | 1 | 0 | 0 | 0 |

GATEWAY TECHNOLOGIES — COPYRIGHT 1992 — ALL RIGHTS RESERVED

EMERGENCY CALL LOGGED AT FRI SEP 04 09:14:58 1992 — TYPE CODE 2

09:15:00a ——— CPS-4000 ——— FRI 09/04/92

*FIG. 3B*

```
─ SYSTEM PARAMETER FILE ─────────────────────────────────────────
 SYSTEM ID : RCK1A            SITE NAME : BARRY'S COUNTY JAIL
 SYSTEM PW :                  LINES : 16
 CALLBACK # : 0000000         DEBUG DISP : N     DEBUG WRITE : N
─────────────────────────────────────────────────────────────────
 TIME SLICE TICKS : 20        PD MAX MAKE : 50      RING RESET : 80
 DTMF INTERDIGIT : 5          PD MIN MAKE : 2       DT LOW FREQ : 300
 DTMF DURATION : 10           PD INTERDIGIT : 15    DT HIGH FREQ : 600
 RING ON DETECT : 3           PD MIN BREAK : 2      DT PERCENTAGE : 20
 RING OFF DETECT : 5
 OFF-HOOK DELAY : 50          LOCAL AREA CODE : 214    BEEP ON DROP : N
 SILENCE DEBOUNCE : 4         MAXIMUM NAME RECORD : 3  BEEP DIALING : N
 LC OFF TIME : 20             ALLOW PHONE TESTING : Y
─────────────────────────────────────────────────────────────────
       GATEWAY TECHNOLOGIES — COPYRIGHT 1992 — ALL RIGHTS RESERVED
─ OUTSIDE LINE NUMBERS ──────────────────────────────────────────
 1. 2147224900   6. 2147224905   11. 2147224809   16. 2222222222   21.
 2. 2147224905   7. 2147224810   12. 2147224809   17.              22.
 3. 2147224906   8. 2147224811   13. 2222222222   18.              23.
 4. 2147224907   9. 2147224813   14. 2222222222   19.              24.
 5. 2147224908  10. 2147224813   15. 2222222222   20.
─────────────────────────────── CPS-4000 ────────────────────────
   ADD COPY EDIT DEL VIEW REPORT TOTAL QUIT
```

FIG. 4A

```
─── SYSTEM PARAMETER FILE - PAGE 2 ───

LOCAL DIALING PREFIX : 9
INTRALATA DIALING PREFIX : 9
LONG DISTANCE DIALING PREFIX : 9
SYSTEM START TIME : 07:00
SYSTEM STOP TIME : 24:00
RECYCLE TIME : 00:00
MESSAGE # FOR 1st BRANDING : 0
MESSAGE # FOR 2nd BRANDING : 0
MESSAGE # FOR IDENTIFICATION : 0
MESSAGE # FOR LOCATION : 0
LANGUAGE SUPPORT    FIRST : Y   SECOND : Y   THIRD : N   FOURTH : N
MAXIMUM ATTEMPTS/NUMBER/DAY : 50    MAX OF 480 MINUTES/NUMBER/ 30 DAYS LD
ALLOW PERSON/PERSON COLLECT : N    MAX OF  60 MINUTES/NUMBER/  1 DAYS LC
```

── GATEWAY TECHNOLOGIES - COPYRIGHT 1991 - ALL RIGHTS RESERVED ──

```
─ LINE LOCATIONS ─

1. CB 1       5. CB 5      9. HC205     13.      17.      21.
2. CB 2       6. CB 6     10. ISO       14.      18.      22.
3. CB 3       7. CB 7     11.           15.      19.      23.
4. CB 4       8. HC208    12.           16.      20.      24.
```

──── CAP-SYSTEM ────

ADD COPY EDIT DEL VIEW REPORT TOTAL QUIT

FIG. 4B

```
┌─────────────────────────────────────────────────────────────┐
│ ── CHANNEL PARAMETER FILE ──                                │
│                                                             │
│ CHANNEL NUMBER : 1           DTMF DETECTION TIME    : 5     │
│ TIME LIMIT : 600             DTMF EDGE EVENT        : 2     │
│ ID SYSTEM : N  FULL : N      DTMF RECEIVE GUARD TIME : 0    │
│ PULSE DETECT : Y                                            │
│ PASSIVE ACCEPT : N           SILENCE COMPRESSION DELAY : 200│
│ START : 00:00  STOP : 24:00  COMMISSARY ACTIVE : Y          │
│                                                             │
│ NUMBER OF RINGS BEFORE NO ANSWER    : 4                     │
│ DELAY BEFORE CALL ANALYSIS BEGINS   : 25                    │
│ TIME OUT DELAY ON NO SIGNAL         : 4000                  │
│ DELAY BEFORE LC DROP IS A CONNECT   : -1                    │
│ DELAY BEFORE RETURNING LC DROP      : 10                    │
│ RETURN CONNECT ON LEADING EDGE      : 2                     │
│ TIME OUT FOR CONTINUOUS SIGNAL      : 650                   │
└─────────────────────────────────────────────────────────────┘

GATEWAY TECHNOLOGIES — COPYRIGHT 1991 — ALL RIGHTS RESERVED

── CAP—SYSTEM ──
              ADD COPY EDIT DEL VIEW REPORT TOTAL QUIT
```

FIG. 5A

— CHANNEL PARAMETER FILE — PAGE 2 —

TOLERANCE ABOVE 1st LOW : 13
TOLERANCE BELOW 1st LOW : 13
TOLERANCE ABOVE 2nd LOW : 13
TOLERANCE BELOW 2nd LOW : 13
TOLERANCE ABOVE HIGH : 13
TOLERANCE BELOW HIGH : 13

MAX TIME FOR 1st LOW TO DETECT BUSY : 90
MAX TIME FOR 2nd LOW TO DETECT BUSY : 90
MAX TIME FOR HIGH TO DETECT BUSY : 90
NUMBER OF ADDITIONAL STATES BEFORE BUSY : 0
SMALLEST SILENCE INTERVAL : 15
SMALLEST SOUND INTERVAL : 19

GATEWAY TECHNOLOGIES — COPYRIGHT 1991 — ALL RIGHTS RESERVED

CAP–SYSTEM
ADD COPY EDIT DEL VIEW REPORT TOTAL QUIT

*FIG. 5B*

```
------- CHANNEL PARAMETER FILE - PAGE 3 -------

MAX TIME FOR SHORT LOW DETECTED AS DOUBLE RING : 90
MIN TIME FOR LONG LOW DETECTED AS DOUBLE RING : 225

ENABLE OPERATOR INTERCEPT DETECTION : Y
MIN INTERCEPT DURATION FOR DETECTION : 10
SILENCE TRAILING EDGE DEBOUNCE : 0
HIGH SIZE : 90
LOW MAX A : 700
LOW MAX B : 530
BEGIN CALL ANALYSIS ON RING NUMBER : 1
HIGH CEILING : 78
LOW CEILING : 58
```

GATEWAY TECHNOLOGIES - COPYRIGHT 1991 - ALL RIGHTS RESERVED

—— CAP-SYSTEM ——
ADD COPY EDIT DEL VIEW REPORT TOTAL QUIT

FIG. 5C

```
─ CHANNEL PARAMETER FILE – PAGE 4 ─────────────

LOW ALLOWED FREQUENCY : 900
HIGH ALLOWED FREQUENCY : 1000
MIN TIME WITHIN FREQUENCY FOR DETECT : 5
BAD SIGNAL REJECT PERCENTAGE : 20
MAX ANSWER DURATION : 1000
SILENCE DEGLITCHING VALUE : 60
```

GATEWAY TECHNOLOGIES – COPYRIGHT 1991 – ALL RIGHTS RESERVED

── CAP–SYSTEM ──
ADD COPY EDIT DEL VIEW REPORT TOTAL QUIT

─── NUMBER CONTROL FILE ───

NUMBER : 2142222222
DATE LAST VERIFIED/CHANGED : 09/02/92
VERIFIED/CHANGED BY : BDB
COUNT SINCE CHANGED/VERIFIED : 0
RESERVED : 0
ALLOW PASSIVE ACCEPT : N
BLOCK CODE : UOK
DIALING INSTRUCTIONS :
LOCAL CALL : Y

RECORD CALLS TO THIS NUMBER : N
ALARM CALLS TO THIS NUMBER : N

GATEWAY TECHNOLOGIES — COPYRIGHT 1992 — ALL RIGHTS RESERVED

|  | ATTEMPTS | ACCEPTS | TIME |
|---|---|---|---|
| RESET DATE : | 09/03/92 | 09/03/92 | 09/03/92 |
| COUNT : | 0 | 0 | 0 SECONDS |
| OVERRIDE : | N | N | N |

CPS-4000

ADD COPY EDIT DEL VIEW REPORT TOTAL QUIT

─ NPA-NXX FILE ─

NPANXX : 214241
DATE LAST VERIFIED/CHANGED : 06/24/92
VERIFIED/CHANGED BY : BDB
ALLOW PASSIVE ACCEPT : N
BLOCK CODE : UOK
DIALING INSTRUCTIONS :
LOCAL CALL : Y

GATEWAY TECHNOLOGIES — COPYRIGHT 1992 — ALL RIGHTS RESERVED

CPS-4000
ADD COPY EDIT DEL VIEW REPORT TOTAL QUIT

*FIG. 7*

```
───── NPA ─────
NPA : 000
DATE LAST VERIFIED/CHANGED : 04/30/92
VERIFIED/CHANGED BY : GTW
ALLOW PASSIVE ACCEPT : N
BLOCK CODE : HBL
DIALING INSTRUCTIONS :
```

GATEWAY TECHNOLOGIES — COPYRIGHT 1991 — ALL RIGHTS RESERVED

───── CAP-SYSTEM ─────
ADD COPY EDIT DEL VIEW REPORT TOTAL QUIT

FIG. 8

NXX FILE

NXX : 000
DATA LAST VERIFIED/CHANGED : 04/30/92
VERIFIED/CHANGED BY : GTW

PLEASE NOTE THAT ALL NXX's IN THIS FILE ARE BLOCKED AT ALL TIMES.

GATEWAY TECHNOLOGIES — COPYRIGHT 1992 — ALL RIGHTS RESERVED

CPS-4000

ADD COPY EDIT DEL VIEW REPORT TOTAL QUIT

FIG. 9

```
─── SYSTEM CONTROL FILE ───

ALLOW   30 CALL ATTEMPTS PER WEEK LOCAL.      ROLLOVER : SAT
ALLOW   30 CALL ATTEMPTS PER WEEK LD.         ROLLOVER : SAT

ALLOW   8 COMPLETIONS PER WEEK LOCAL.         ROLLOVER : SAT
ALLOW   8 COMPLETIONS PER WEEK LD.            ROLLOVER : SAT

ALLOW   240 MINUTES TALK TIME PER WEEK LOCAL. ROLLOVER : SAT
ALLOW   240 MINUTES TALK TIME PER WEEK LD.    ROLLOVER : SAT
```

GATEWAY TECHNOLOGIES — COPYRIGHT 1992 — ALL RIGHTS RESERVED

CPS-4000

ADD COPY EDIT DEL VIEW REPORT TOTAL QUIT

FIG. 10

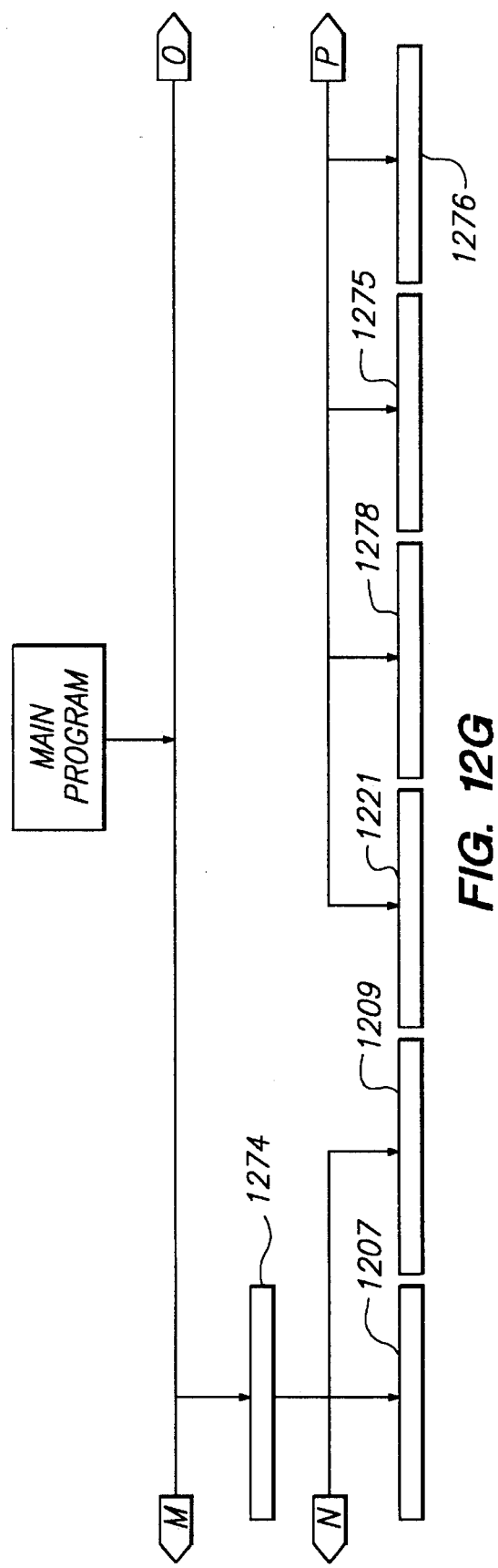
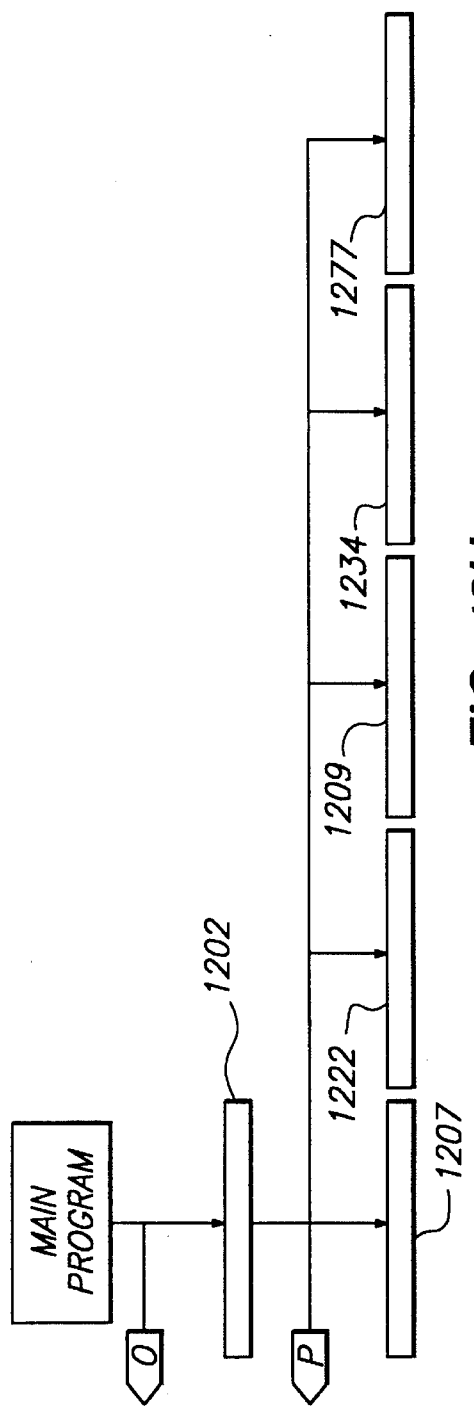

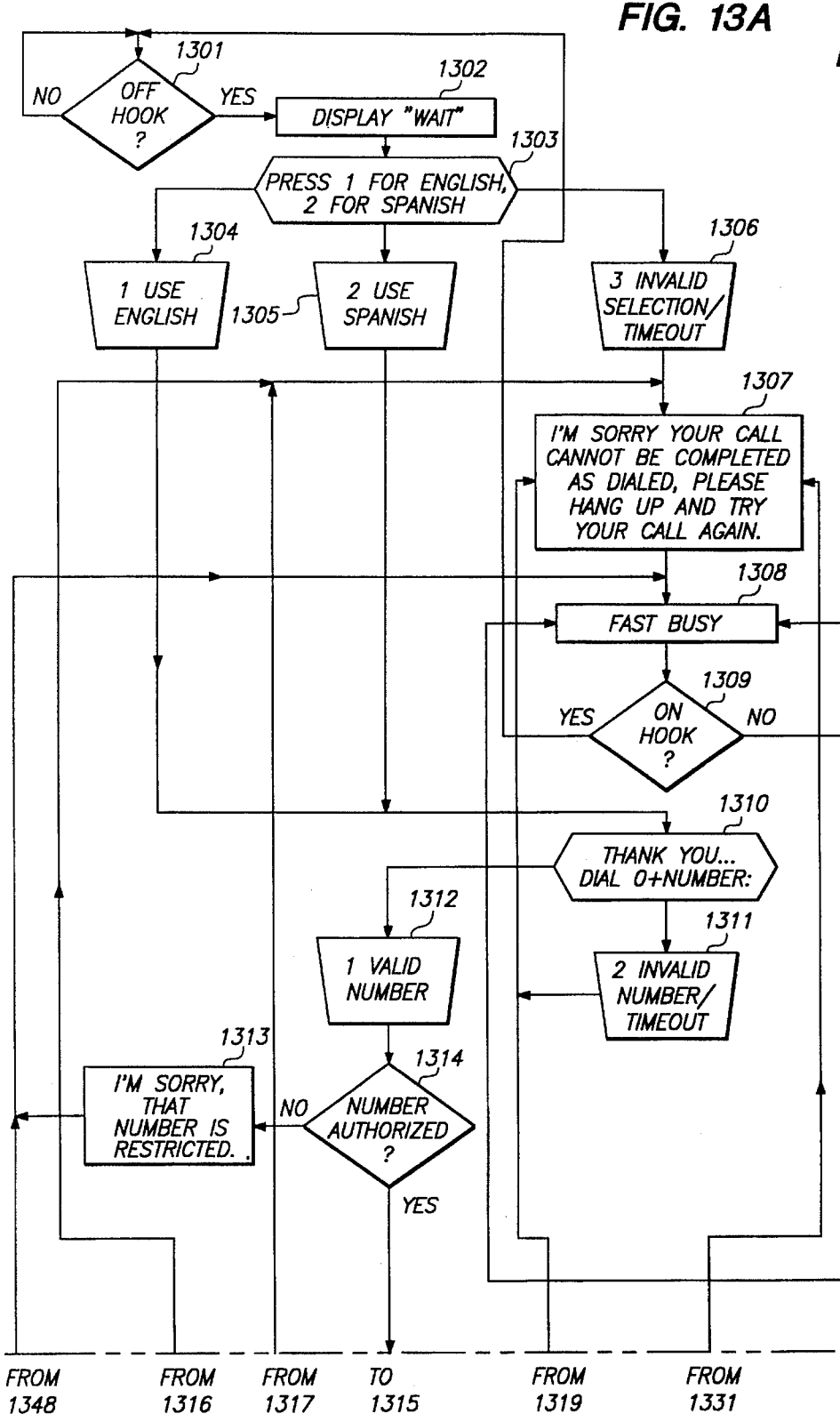

SELECTIVELY ACTIVATED INTEGRATED REAL-TIME RECORDING OF TELEPHONE CONVERSATIONS

BACKGROUND OF THE INVENTION

1. Field of the Invention

This invention relates to the field of telecommunications, and more particularly to a system and method of recording telephone calls in response to predefined triggering events, and storing the recordings in a manner facilitating and simplifying future retrieval.

2. Description of the Related Art

Conventional systems for recording telephone calls typically require the use of multiple track recorders wired into a conventional telephone system. If multiple phone lines are used, one track is dedicated to each line. The recorders are then placed into a continuous recording mode, so that all conversations are recorded. If a selected subset of telephone calls are of particular interest and are to be stored, an operator must listen to each recorded conversation on each track in order to determine whether the recorded call is to be stored.

Some prior art systems are capable of detecting the DTMF digits dialed by the telephone and display the number dialed for each recorded call. Thus, the operator can skip calls made to numbers that are not of interest.

However, prior art systems do not provide means for automatically selecting particular calls for recording based on particular characteristics or events. Thus, there is no automated mechanism for triggering recording upon, for example, use of a specific line, or access by a specific user, or a given number of attempts made to dial a particular number. Instead, an operator must listen to the conversation and manually indicate whether or not it should be recorded. This is a time-consuming process, and may result in error. Furthermore, there is an increased possibility in such systems of illegal monitoring and/or recording of privileged conversations, as between an attorney and a client.

SUMMARY OF THE INVENTION

The preferred embodiment of the present invention operates in a telephone system for institutions such as jails and correctional facilities. It allows administrators to control and monitor the recording of telephone calls made by or to inmates, and to provide ease of retrieval of recorded conversations.

In accordance with the present invention, there is provided a system and method for recording calls automatically in response to the occurrence of specific triggering events, as pre-defined under software control by a system administrator. Triggering events may include, for example, use of a specific line, attempts to use particular features (such as three-way calling), attempts to dial particular telephone numbers, or use by a particular person. Recorded calls are digitized and stored in standard MS-DOS files on either a local computer system or a remote computer across a network. Other file storage schemes may also be employed.

Thus, the present invention allows an operator to predetermine which calls should be recorded. It also allows an administrator to specify particular types of calls for which recordings should not be made, such as communications that are protected by attorney-client privilege. This reduces the possibility of illegal monitoring and/or recording of such conversations.

Stored digitized recordings may be selected for playback under software control by a system administrator. Selected recordings are then converted from digitized form into analog signals for playback on a standard telephone handset. Thus, the present invention allows quick and easy search and playback of recorded calls, reducing the amount of time needed to process recordings.

The system of the present invention allows control of recordings from within a conventional telephone system. The integrated nature of the system provides cost savings and improved flexibility.

BRIEF DESCRIPTION OF THE DRAWINGS

FIG. 3A is a sample Main Screen of the preferred embodiment of the invention. FIG. 3B is a sample Secondary Screen of the preferred embodiment of the invention.

FIGS. 4A and 4B are sample entry screens for the System Parameter File.

FIGS. 5A, 5B, 5C, and 5D are sample entry screens for the Channel Parameter File.

FIG. 6 is a sample entry screen for the Number Control File.

FIG. 7 is a sample entry screen for the NPANXX Control File.

FIG. 8 is a sample entry screen for the NPA Control File.

FIG. 9 is a sample entry screen for the NXX Control File.

FIG. 10 is a sample entry screen for the Fraud Control Parameter File.

FIGS. 12A to 12H show the structure of GWMAIN.EXE.

FIGS. 13, 13A 13B, and 13C are a flowchart showing the operation of GWMAIN.EXE.

DESCRIPTION OF THE PREFERRED EMBODIMENT

Figure 1:
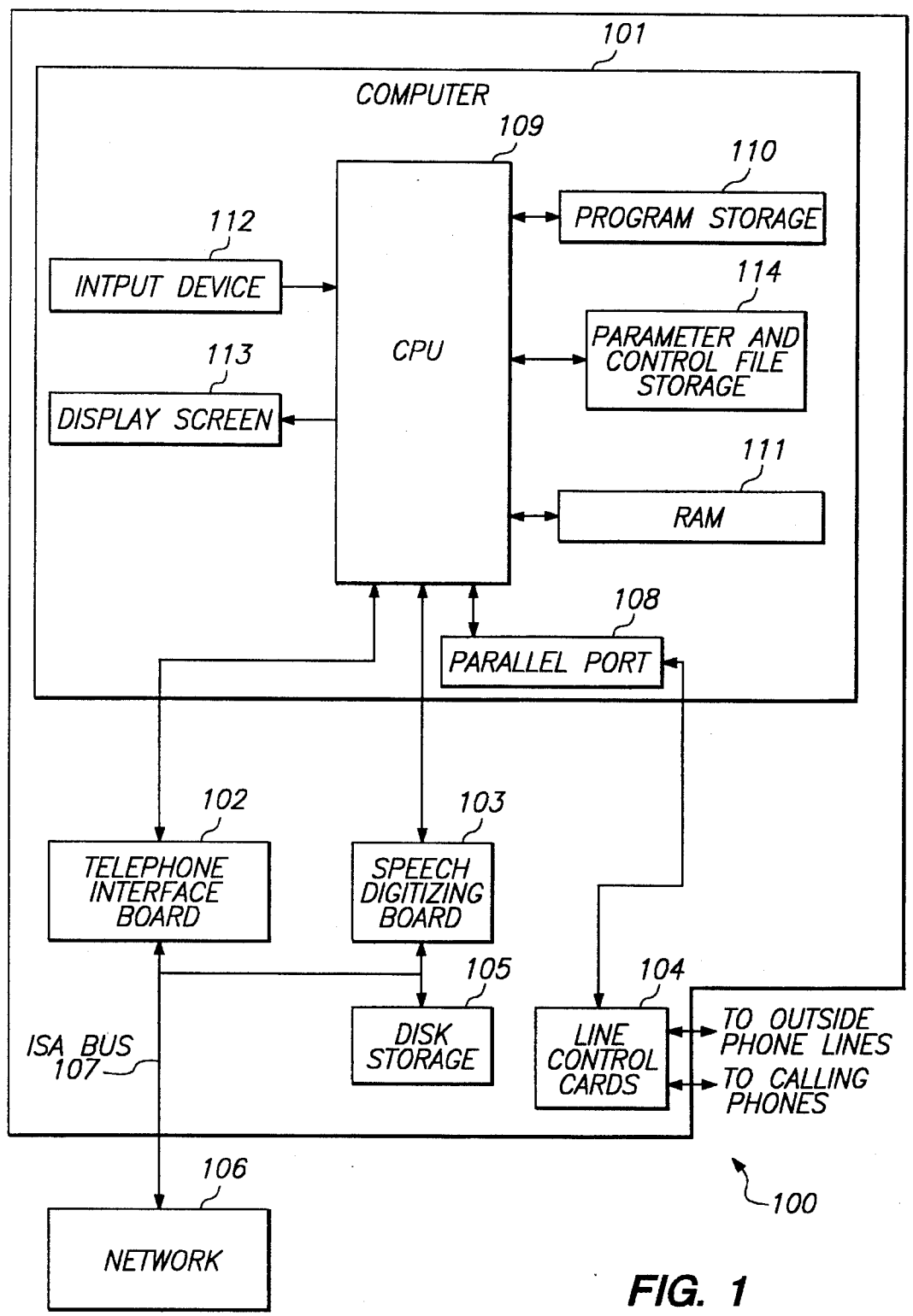
FIG. 1 is a block diagram of the preferred embodiment of the invention.

The preferred embodiment of the present invention operates as an integral part of a telephone system such as the CPS-4000 offered by Gateway Technologies, Inc. Referring now to FIG. 1, there is shown a block diagram of a typical hardware environment for the present invention. The CPS-4000 telephone system 100 includes a standard personal computer 101, together with a conventional telephone interface board 102 and a speech digitizing board 103. Such boards are available from companies such as Dialogic, Rhetorex, and PIKA. Boards 102 and 103 are connected to disk storage 105 and (if desired) a network 106 via a conventional ISA bus 107. System 100 also includes line control cards 104 for providing switching and access control for the outside telephone lines and for calling phones connected to system 100. Cards 104 are connected to computer 101 via a parallel port 108.

Computer 101 contains central processing unit (CPU) 109 that runs software program instructions, stored in program storage 110, which direct CPU 109 to perform the various functions of system 100. Parameter and Control File Storage 114 stores information that is used by CPU 109 in performing the program instructions, as described below. Random access memory (RAM) 111 is used as workspace while performing program instructions and other functions. The system administrator interacts with system 100 by supplying commands via one or more user input devices 112 (such as a keyboard, mouse, and the like). A display screen 113 may be used to provide status information and to prompt the administrator for commands.

In the embodiment illustrated herein, the hardware elements of computer 101 are conventional components of a personal computer or workstation. The inventive aspects of the present invention lie primarily in the software instructions, stored in program storage 110, that control the hardware elements shown in FIG. 1, and the control and parameter files stored in 114.

Figure 2:
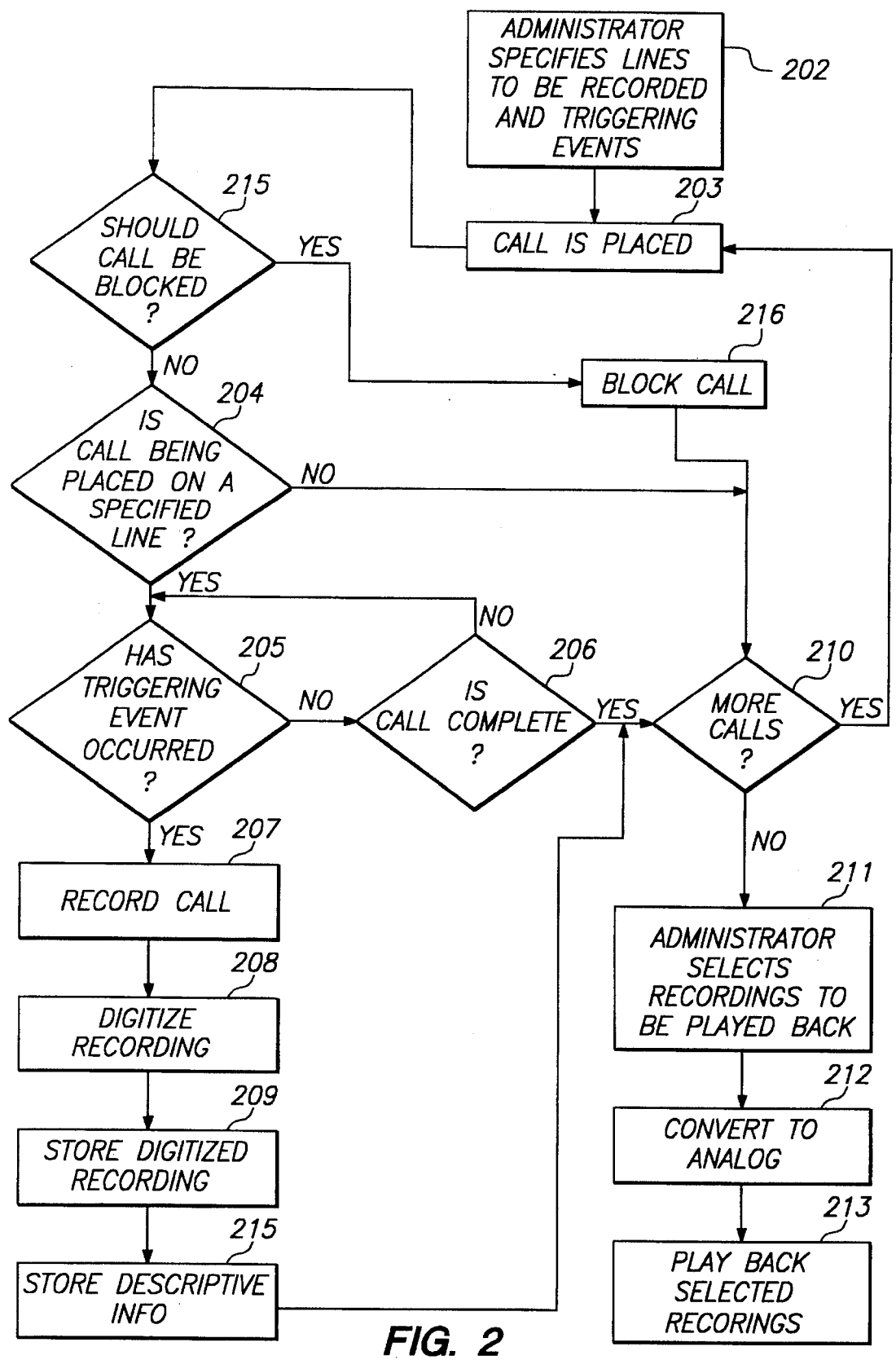
FIG. 2 is a flowchart showing the overall operation of the invention.

Referring now to FIG. 2, there is shown a flow chart of the overall operation of the present invention. First, an administrator specifies 202 which telephone lines will be subject to recording, and identifies particular events that will trigger recording. This is done under software control, using input devices 112 and display screen 113 to modify control information as will be described in more detail below.

For each call made by or to an inmate, steps 203 to 216 as shown in FIG. 2 are performed.

The call is placed 203. The CPS-4000 system software automates this step. In processing the call, the system checks control and parameter files as described below, in order to determine whether the call should be blocked 215. If so, the call is blocked 216.

Then, the system checks 204 whether the call is being placed on a line that was specified for recording by the system administrator. This is done by checking control and parameter files as described below. If the line has been specified for recording, the system proceeds to step 205. If not, the system proceeds to step 210.

The system then waits until either a triggering event occurs 205 or the call is completed 206. In order to determine whether a triggering event has occurred, the system consults parameter and control files 114, which contain definitions and specifications as to which events should trigger recordings, as described below. The system also monitors activity on the telephone line to check whether any of the specified triggering events has occurred. If the call is completed before a triggering event occurs, the system proceeds to step 210. If a triggering event occurs first, the system records the call 207, digitizes the recording 208, stores the digitized recording 209, and stores descriptive information regarding the call 215.

If there are more calls to be processed 210, the system returns to step 203. If not, the administrator may select recordings 211 to be played back. This is done under software control, using input devices 112 and display screen 113 to view information describing stored recordings and to select recordings. Selected recordings are converted 212 from digital form to analog, and the system then plays them back 213.

Figure 11:
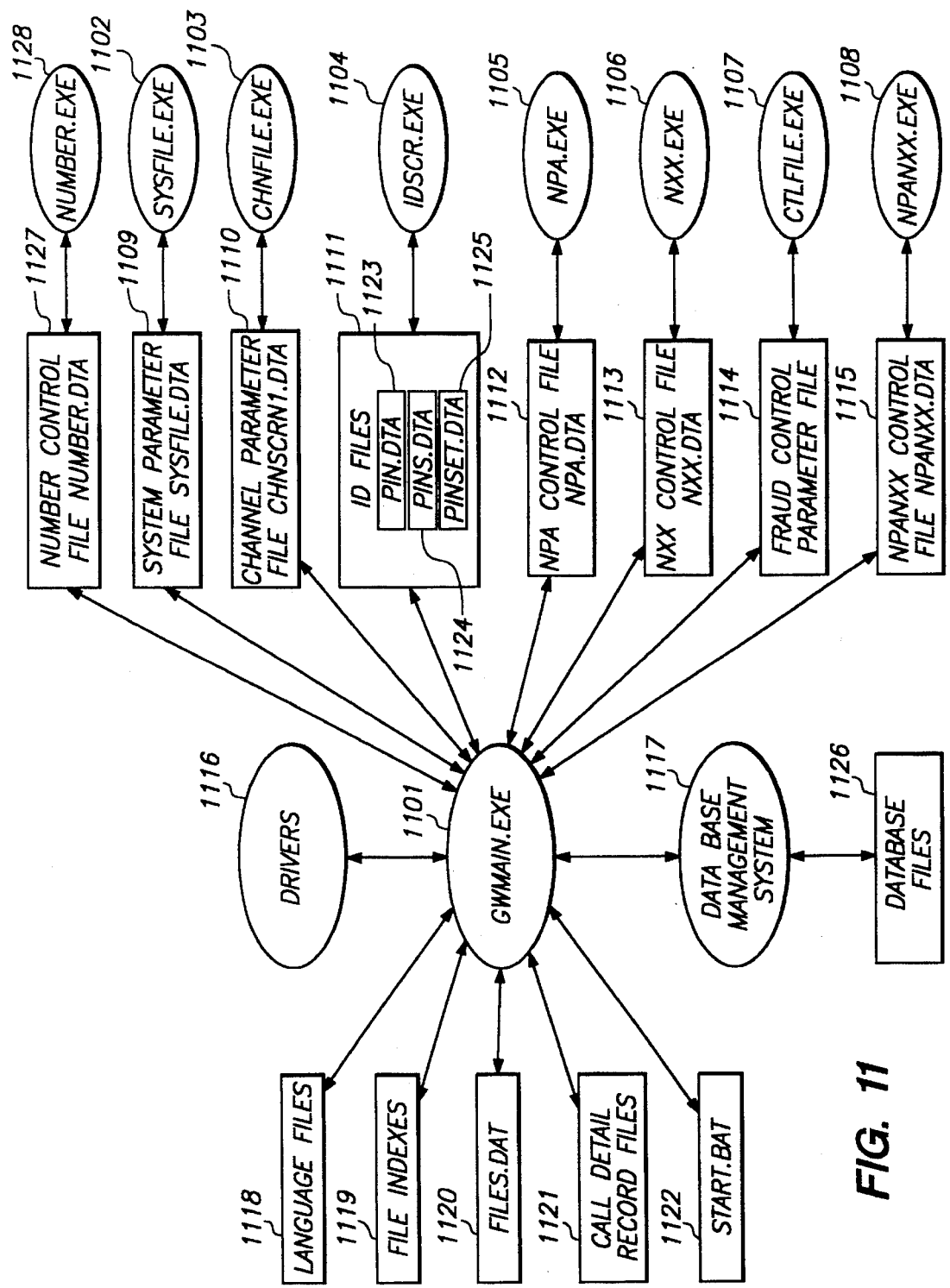
FIG. 11 is a block diagram of the software organization of the system.
Figure 12A:
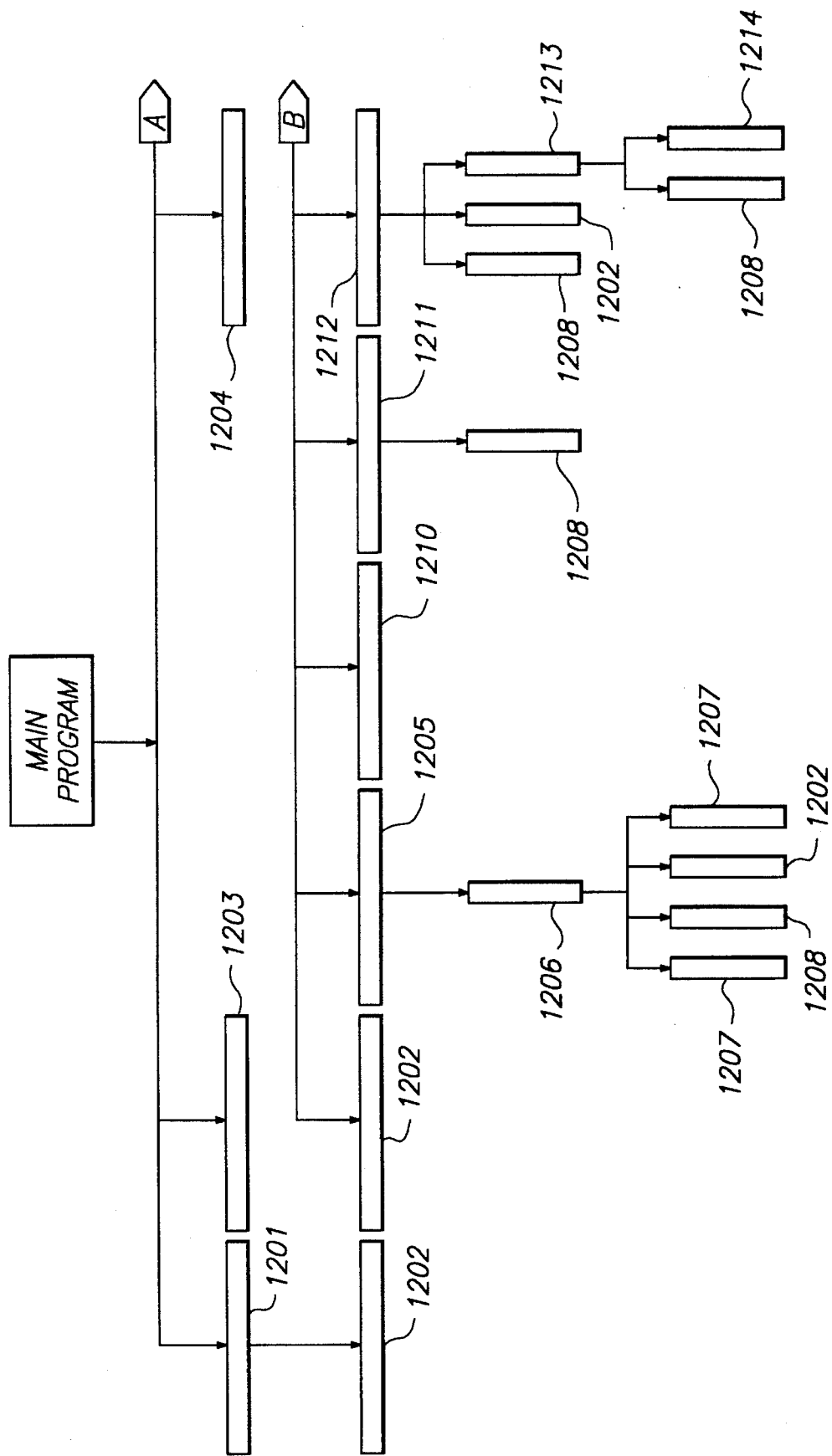
Figure 12B:
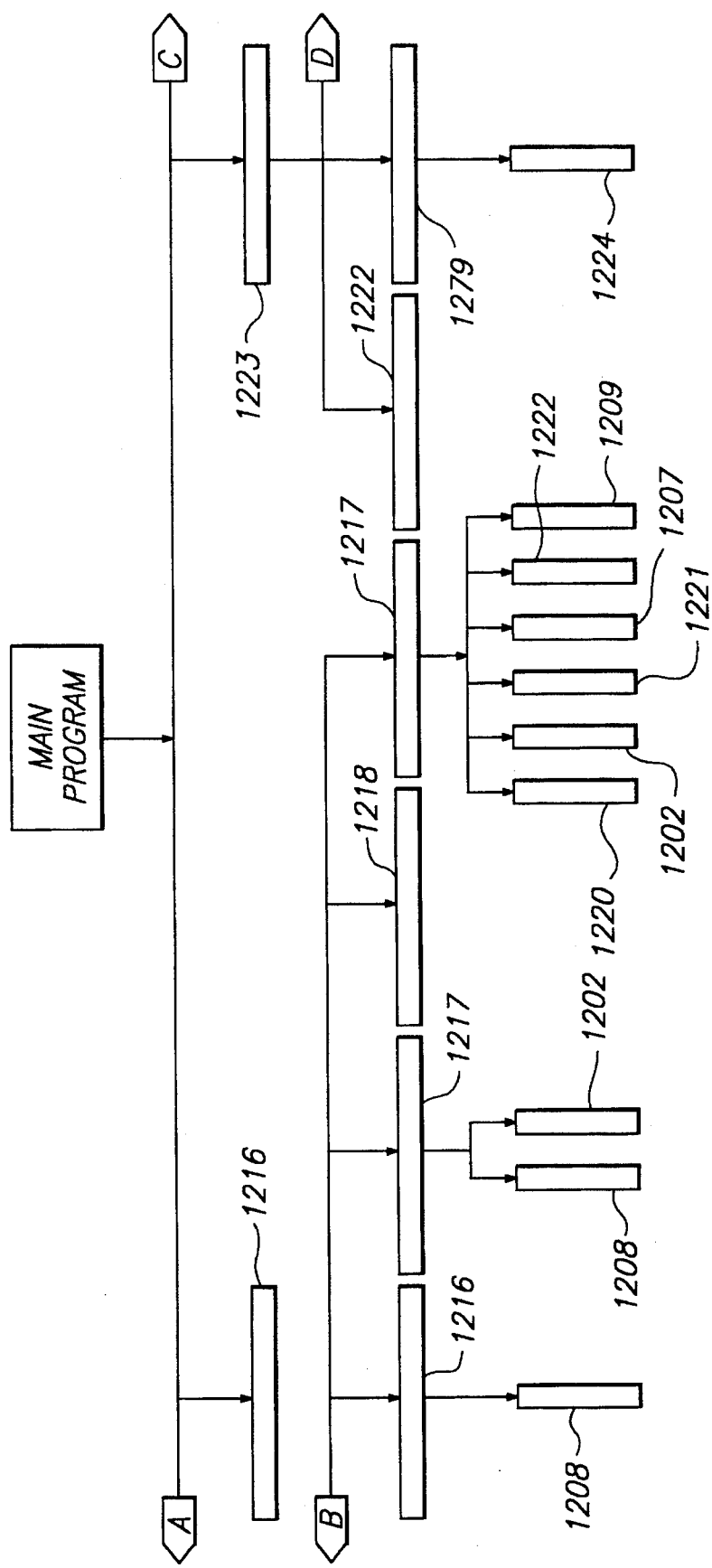
Figure 12C:
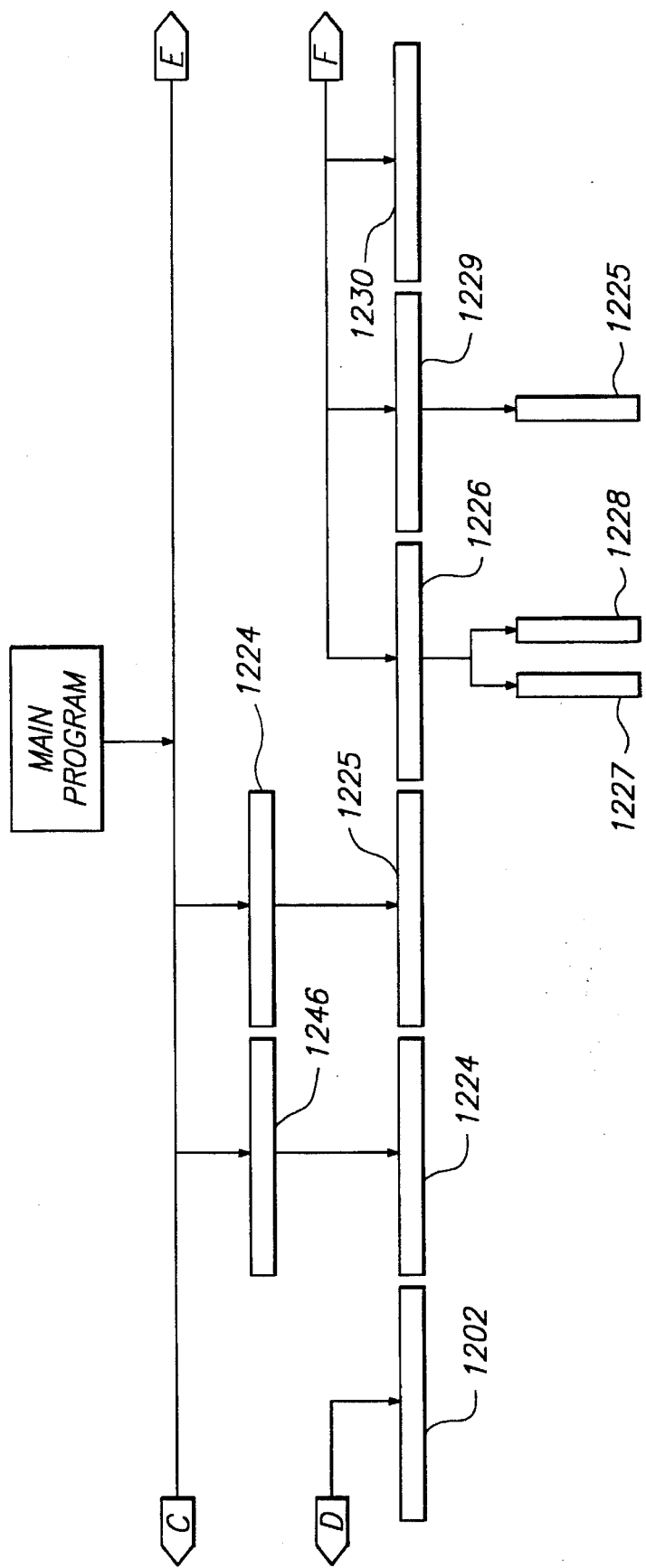
Figure 12D:
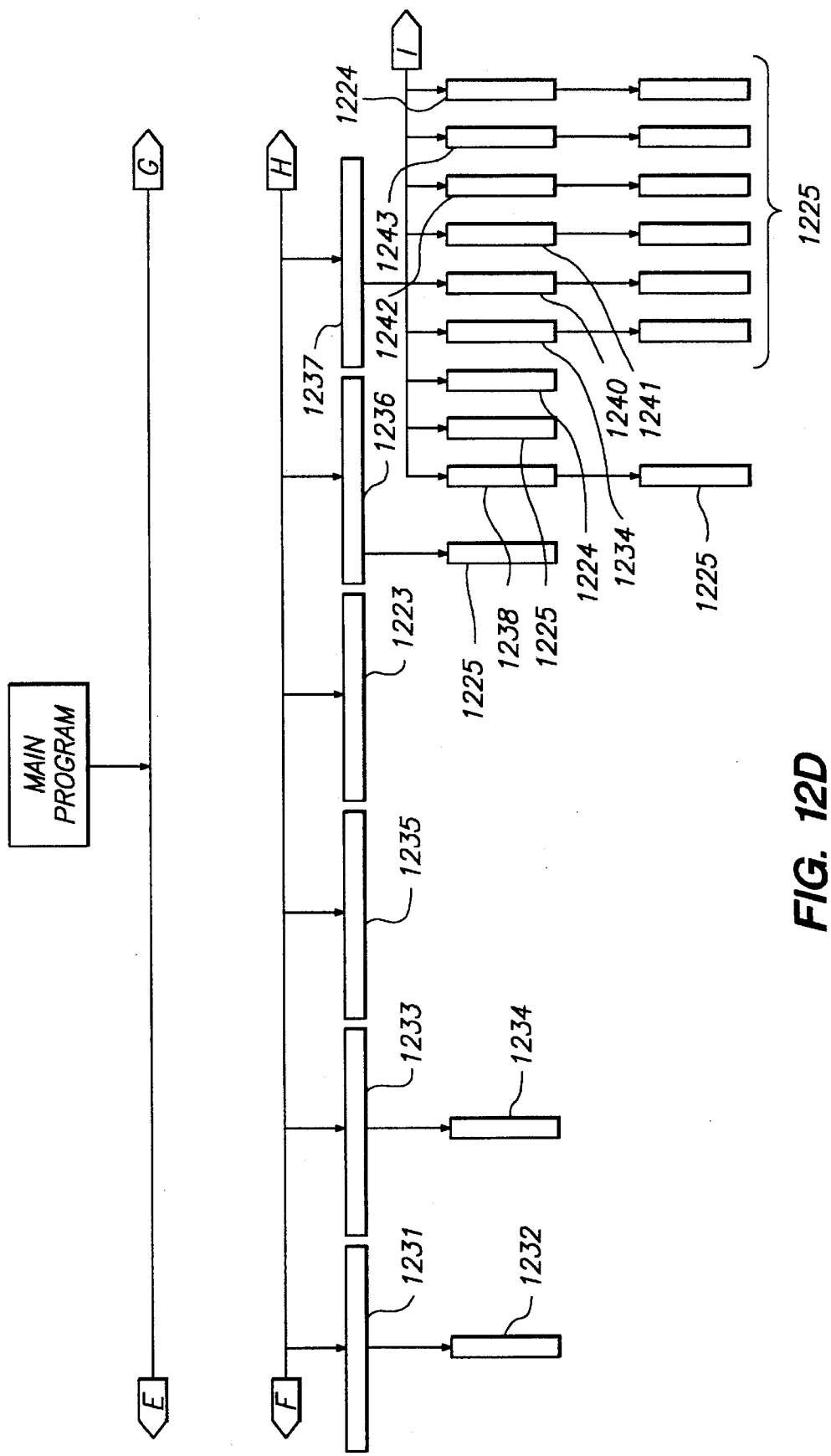
Figure 12E:
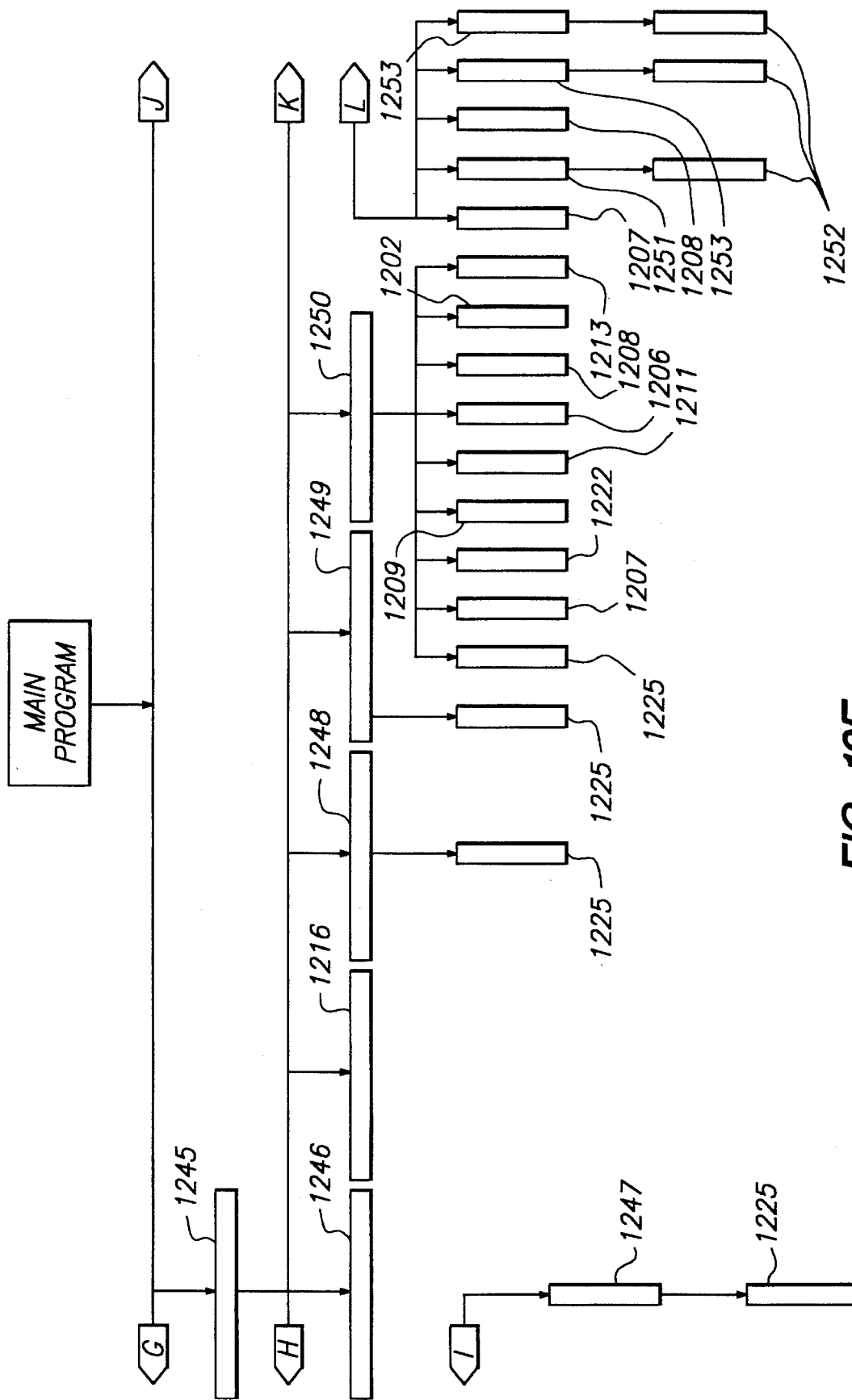
Figure 12F:
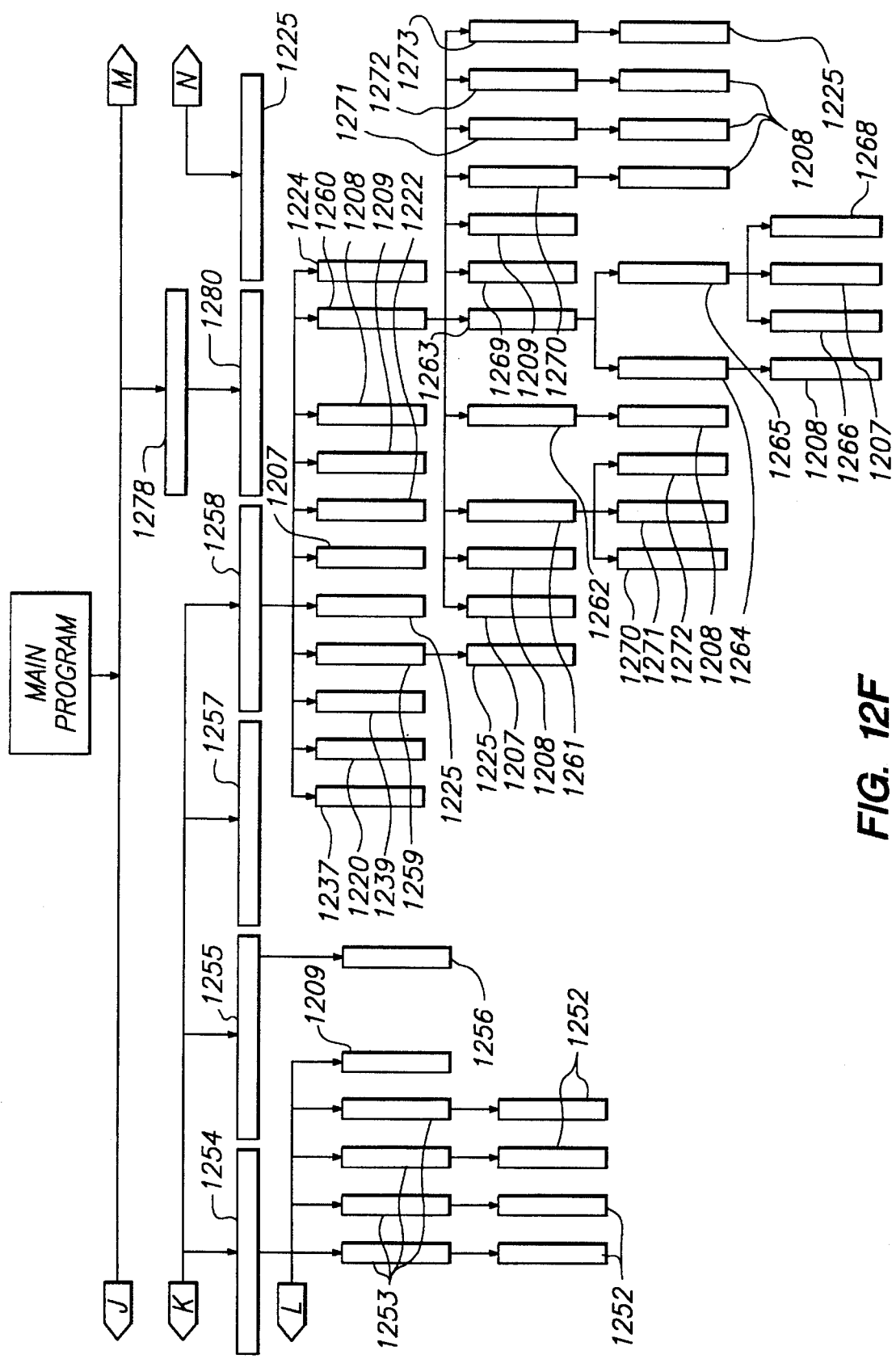

In the preferred embodiment, the above steps are performed under the control of software programs that are stored in program storage 110. Referring now to FIG. 11, there is shown the organizational structure of the software programs and associated files. The software programs include a main program, GWMAIN.EXE 1101, and eight support programs: SYSFILE.EXE 1102, CHNFILE.EXE 1103, IDSCR.EXE 1104, NPA.EXE 1105, NXX.EXE 1106, CTLFILE.EXE 1107, NPANXX.EXE 1108, and NUMBER.EXE 1128. The support programs are used to provide administrator access to parameter and control files, as shown in FIG. 11: System Parameter File SYSFILE.DTA 1109, Channel Parameter File CHNSCR1.DTA 1110, ID Files 1111, NPA Control File NPA.DTA 1112, NXX Control File NXX.DTA 1113, Fraud Control Parameter File 1114, NPANXX Control File NPANXX.DTA 1115, and Number Control File NUMBER.DTA 1127.

ID Files 1111 include three components: PIN.DTA file 1123 containing information about the inmates; PINS.DTA file 1124 containing information about the allowed numbers for the inmates, including whether recordings should be made for particular numbers when called by particular inmates; and PINSET.DTA file 1125 containing Class of Service information that can be used to selectively activate recordings based on the selection of the Class of Service for the telephone call. These files are used for validation of the called number and to set certain parameters during the call. Specifically, these files contain fields that activate the digital recording feature automatically if the system administrator has indicated that recordings are to take place. Thus, recordings can be made for particular called numbers, particular inmates placing calls, or by a combination of the two parameters. The system administrator can also control recordings on a line-per-line basis using a keyboard function key.

Also included are: drivers 1116 such as Dialogic D40, for providing communication between the Disk Operating System (DOS) of computer 101 with boards 102 and 103; a database management system 1117 such as Btrieve, for maintaining database files 1126, up to four language files 1118 and file indexes 1119; and a files configuration file named FILES.DAT 1120.

A DOS batch file called START.BAT 1122 initializes the required drivers, namely D40DRV.EXE and BTRIEVE.EXE in the preferred embodiment. START.BAT 1122 also selects the desired operating characteristics of GWMAIN.EXE 1101 by the use of command line parameters. The following is a representative list of command line parameters that may be used in the preferred embodiment:

- v=display version number and exit
- b=Gateway Line Interface boards are being used
- r=this implementation is allowed to make recordings
- px=use parallel port x for communication with the Line Interface Boards
- d=turn off DTMF detection
- l=no loop current extenders on boards
- f=turn off full reporting on F7 display
- c=concentrator in use
- e=screen saver turned on
- a=allow Free call cut-through without wait for answer detection
- x=switch relays on messages for Rhetorex boards
- 0=single zero DTMF detection enabled The following is a typical START.BAT file 1122:

@ echo off d40drv -e512 btrieve/p:4096/f:32/m:64 gwmain -r-b-p1

Language files 1118 are ADPCM compressed, digitized voice prompts stored in a standard DOS file. This file is then indexed using file indexes 1119 to allow access to each of the voice prompts within the file. In the preferred embodiment, language files 1118 are designated as english.vox and spanish.vox, and file indexes 1119 are designated as index.1, index.2, etc. Additional language files and file indexes may also be provided.

In the preferred embodiment, descriptive information concerning calls is placed in output files called Call Detail Record (CDR) files 1121. These files are stored on drive "D:" in a subdirectory called \CDR. The files include information such as start time, stop time, calling number, called number, user id, call disposition codes, error codes, and validation codes. Database files 1126 include other files used by the system, including: <linenumber>.nme, for storing user names during call progress; <linenumber>.cnm, for storing called party names for person-to-person collect calls; EMERG.LOG, for storing information about emergency calls made within the facility using an internal alarm system; RECORD.LOG, for storing information about recordings; DEBUG.DTA, for storing debugging data; and <linenumber>.nbr, for storing callback numbers. The designation "<linenumber>" refers to a number indicating a particular telephone line. Thus, for example, the name for line 15 would be stored in file 15.nme.

FILES.DAT 1120 is a data file used by the system to determine the location of necessary files for GWMAIN.EXE 1101. For each file needed by the system, FILES.DAT 1120 lists a file identifier and a path indicating the location of the file in Parameter and Control File Storage 114. The following is a typical FILES.DAT file 1120:

NUMBER, d:\number\number.dta

SYSTEM, sysfile.dta

CHANNEL, chnscr1.dta

GRID, idscr.dta

NXX, nxx.dta

NPA, npa.dta

NPANXX, npanxx.dta

INDEX1, c:\main\speech\index.1

INDEX2, c:\main\speech\index.2

INDEX3, c:\main\speech\index.3

INDEX4, c:\main\speech\index.4

LNG 1, c:\main\speech\english.vox

LNG2, c:\main\speech\spanish.vox

CDR, d:\cdr\

RECORD, d:\recs\

Recordings are stored in disk storage 105 at a location specified by the RECORD identifier of FILES.DAT 1120.

GWMAIN.EXE 1101

GWMAIN.EXE 1101 is the main program for controlling the operation of the system. GWMAIN.EXE 1101 is an event-driven, real-time, multitasking program that runs in conjunction with MS-DOS 5.00. It is modular in design, allowing for control of complex functions while facilitating program maintenance and updates for future applications. GWMAIN.EXE 1101 uses parameter files and control files 1109–1127 that can be easily changed to maximize flexibility and ease of support.

The structure of GWMAIN.EXE 1101 is shown in FIGS. 12A–12H. Each of the items shown in these figures is described in Table 1 below:

TABLE 1

| Routine Reference Number | Description |
| --- | --- |
| chkargs 1201 | Parses command line paramters, sets global variables based on parameters |
| sysexit 1202 | Closes all files, writes closing CDR record, shuts down all lines, exits from program |
| get_fnames 1203 | Reads and parses FILES.DAT file |
| sysinit 1204 | Initializes device drivers, opens files, initializes all lines and variables |
| get_system_info 1205 | Reads in SYSFILE.DTA information |
| setup_dcb 1206 | Initialized Device Control Block using information from SYSFILE.DTA |
| set_idle_flag 1207 | Sets flag to force serialization of DOS commands such as disk reads/writes - will not set flag or allow further operation on the line while flag is set |
| write_btrv_log 1208 | Writes error log on any error during use of a database file |
| clear_idle_flag 1209 | Resets DOS serialization flag |
| curoff 1210 | Turns off screen cursor |
| get_lcctrl_info 1211 | Reads LCCTRL.DTA file |
| get_channel_info 1212 | Read CHNSCRL.DTA file - sets up channel parameter block using read information |
| read_file 1213 | Read information from CHNSCRL.DTA file |
| move_data_in 1214 | Move channel information into Channel Parameter Block |
| start_clock 1215 | start interrupt driven clock and time and date display |
| commissary_active 1216 | Compares current date/time with Commissary setup and sets/resets commissary open flag |
| open_btrv_files 1217 | Opens database files for use by the system |
| open_other_files 1218 | Opens speech files |
| setup_channels 1219 | Initializes each line |
| getch1 1220 | Waits for key press |
| setport 1221 | Sets relays on Line Interface board via parallel port |
| write_cdr 1222 | Writes CDR record into daily CDR file |
| check_time 1223 | Synchronizes PC clock with CMOS "real-time" clock, checks to see if upload files needs to be checked, screen displays updated |
| disp_msg 1224 | Displays line status information on screen |
| disp 1225 | Routine to write text directly to video memory |
| check_loop_current 1226 | Checks Line Interface Board to see if loop current change has occurred |
| check_inside 1227 | Checks inside line loop current |
| check_outside 1228 | Checks outside line loop current |
| check_loop_drop_time 1229 | Checks length of loop current drop |
| check_for_phone_onhk 1230 | Checks to see if inside phone is on-hook |
| blank_screen 1231 | Screen saver routine |
| displ 1232 | Routine to write text directly to video memory and ignore screen updates while screen is blanked |

TABLE 1-continued

| Routine Reference Number | Description |
| --- | --- |
| check_reboot_okay 1233 | Makes sure that no lines are in use |
| reboot 1234 | reboots system |
| check_random 1235 | Checks to see if random interval has elapsed for playing anti-fraud messages |
| display_debug_screen 1236 | displays screen of information useful during debugging |
| display_current_screen 1237 | redraws current screen |
| disp_screen1 1238 | displays primary screen |
| rst_bottom 1239 | clears system message area of screen |
| disp_screen2 1240 | display secondary screen |
| disp_calls 1241 | displays call count information on secondary screen |
| disp_okay 1242 | displays okay count information on secondary screen |
| disp_deny 1243 | displays denied count information on secondary screen |
| disp_bad 1244 | displays bad count information on secondary screen |
| waitevt 1245 | main loop - waits for event to be reported back from device drivers |
| check_for_out_of_service 1246 | checks to see if out-of-service time has occurred |
| disp_screen3 1247 | displays third screen |
| display_screen_msgs 1248 | displays call progress information |
| disp_screen3_data 1249 | displays third screen information |
| check_for_uploads 1250 | checks to see if upload file exists |
| parse_num_rec 1251 | parses number record from upload file and updates NUMBER.DTA |
| strtok1 1252 | parses string based on comma delimiter |
| parse_??????_rec 1253 | parses specified record type from upload file and updates local files |
| get_upload_records 1254 | reads upload records from upload file |
| time_change_check 1255 | checks to see if daylight savings time change is needed |
| lines_open 1256 | used by time_change_check to make sure no lines are being used when time is changed |
| kbhit1 1257 | routine that tells if key has been pressed |
| get_input 1258 | read keyboard and perform commands |
| clr_bottom 1259 | clear System Messages area |
| new_verify 1260 | verify called number using local tables |
| check_blockcode 1261 | check NUMBER.DTA, NPANXX.DTA, NPA.DTA and NXX.DTA files for block code |
| check_for_number 1262 | verifies that number is in NUMBER.DTA |
| check_limits 1263 | checks to see that fraud limits have not been exceeded |
| get_cos_limits 1264 | get class of service limits from file |
| check_rollover 1265 | see if fraud limits should be rolled over |
| to_julian 1266 | converts MM/DD/YY to julian date |
| from_julian 1267 | converts julian date to MM/DD/YY |
| dow 1268 | returns day of week |
| set_call_parameters 1269 | sets record, alarm, etc based on data in NUMBER.DTA |
| check_npanxx 1270 | checks number in NPANXX.DTA file |
| check_npa 1271 | checks number in NPA.DTA file |
| check_nxx 1272 | checks number in NXX.DTA file |
| disp_sys_msg 1273 | displays message in system message area of screen |
| prt_codes 1274 | prints debugging codes on screen |
| stop_clock 1275 | turns off real time clock and time and date display |
| watch_dog_long 1276 | sets hardware watchdog to 30 minutes |
| curon 1277 | turns curson on |

When GWMAIN.EXE 1101 runs, it accepts command line parameters specifying various options and configurations, including:
- Specification of the type of interface boards 102, 103 and line control
- cards 104 being used;
- Specification of which port to use to communicate with line control cards 104;
- Specification of interrupt lines for boards 102, 103; and
- Enablement of DTMF detection during a call (to terminate the telephone connection when certain digits are dialed during a call).

As described above, command line parameters are specified in a DOS batch file named START.BAT 1122 that initializes the system by loading GWMAIN.EXE 1101 in a conventional manner.

Figure 13B:
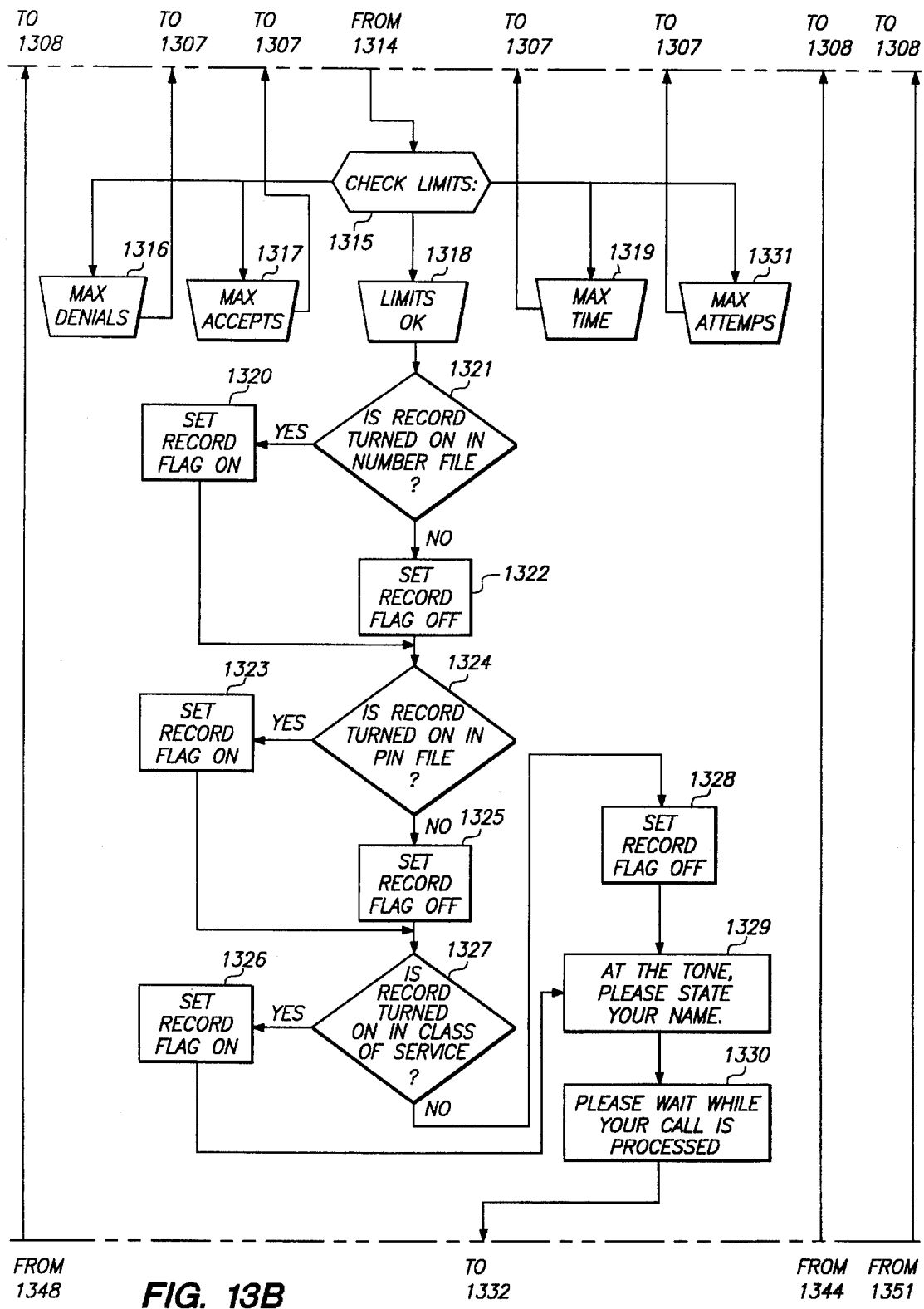
Figure 13C:
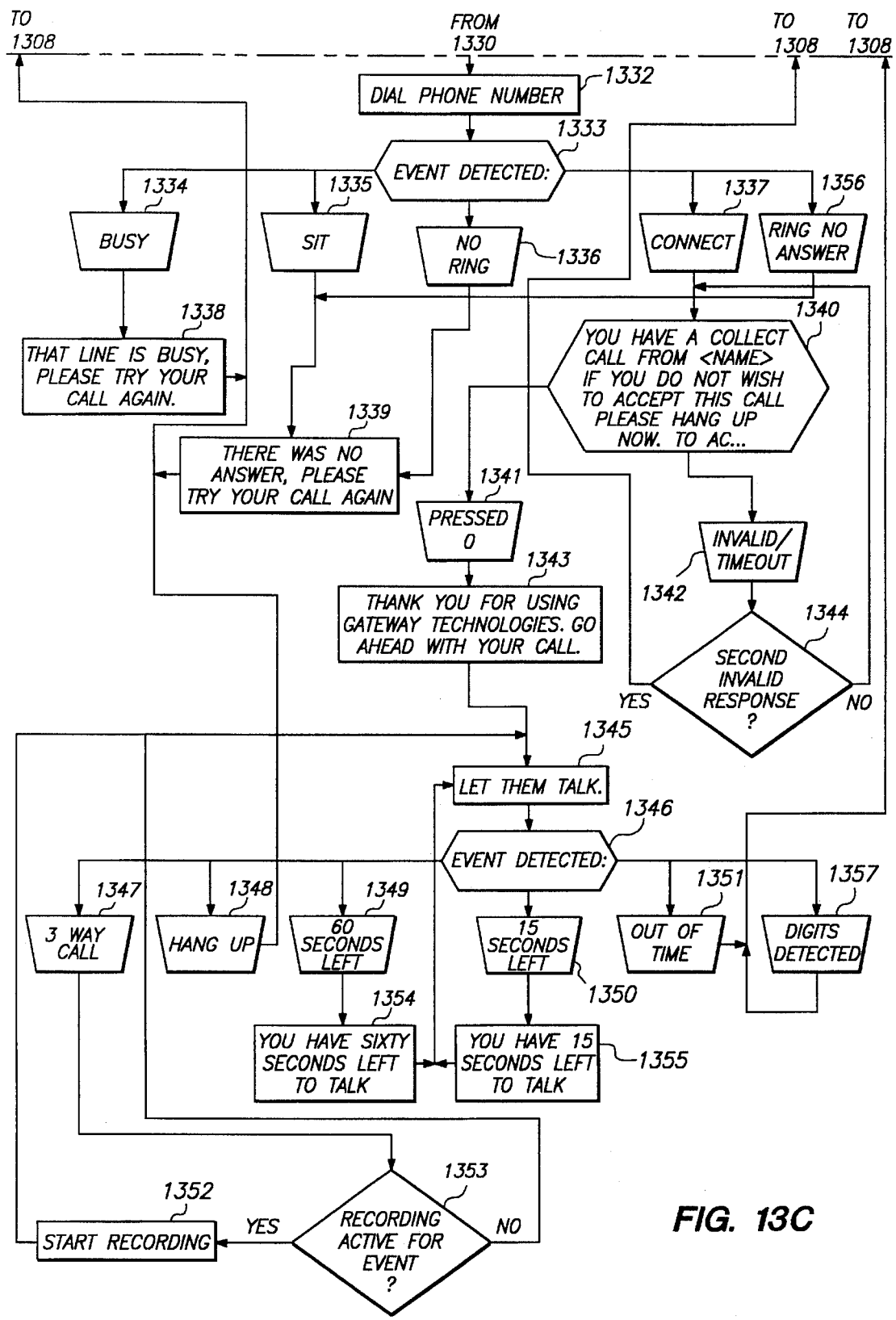

Referring now to FIGS. 13A to 13C, there is shown a flowchart of the operation of GWMAIN.EXE in the preferred embodiment.

The system checks 1301 to see if the telephone is off-hook. If so, it displays "WAIT" 1302. Then, it prompts the user 1303 to select a language. If the user presses "1", the system uses English 1304; if the user presses "2", the system uses Spanish 1305; and if the user presses "3" or an invalid selection, or if there is a timeout, the system considers this to be an invalid selection 1306, informs the user that the call cannot be completed 1307, sounds a "fast busy" signal 1308, checks that the user has hung up 1309, and returns to step 1301.

After a language has been selected, the system prompts the user 1310 to dial a telephone number. If the user dials an invalid number or there is a timeout 1311, the system informs the user that the call cannot be completed 1307, sounds a "fast busy" signal 1308, checks that the user has hung up 1309, and returns to step 1301. If the user dials a valid number 1312, the system checks to see whether the number is authorized 1314 by referring to the control files described above. If not authorized, the system informs the user that the number is restricted 1313 and returns to step 1308. If the number is authorized, the system checks 1315 to see whether any limits have been exceeded for this number. If the user has reached the maximum number of denied calls 1316, accepted calls 1317, minutes called 1319, or attempted calls 1331 to the number, the system returns to step 1307. If none of the limits has been exceeded 1318, the system proceeds to check whether a recording is to be made of the telephone call.

First, the system checks whether the NUMBER.DTA file 1127 indicates that recordings are to be made 1321. If so, the system sets a record flag for this call to "on" 1320 indicating that this call will be recorded. If not, it sets the flag to "off" 1322. Then, the system checks whether the PIN.DTA file 1123 indicates that recordings are to be made 1324. If so, the system sets a record flag for this call to "on" 1323 indicating that this call will be recorded. If not, it sets the flag to "off" 1325. Then, the system checks 1327 the PINSET.DTA file 1125 (class of service) indicates that recordings are to be made 1324. If so, the system sets a record flag for this call to "on" 1326 indicating that this call will be recorded. If not, it sets the flag to "off" 1328.

Next, the system prompts the user 1329 to state his or her name. Then, the user is instructed to wait 1330 while the call is processed. The system then dials the phone number 1332, and waits until an event is detected 1333. If busy 1334, the system so informs the user 1338 and returns to step 1308. If a Special Intercept Tone (a triple tone generated by the telephone company to indicate that the number has been disconnected or the network is busy; also called SIT) has sounded 1335, or no ring 1336, or no answer 1356, the system so informs the user 1339 and returns to step 1308. If a connection is made 1337, the system prompts the called party to press 0 to accept the collect call or hang up 1340. If the called party gives an invalid response or there is a timeout 1342, the system proceeds to step 1344. In step 1344, if a second invalid response is received, the system returns to step 1307. If a second invalid response is not received, the system returns to step 1340 and repeats the prompt.

If the called party presses "0" 1341 indicating acceptance of the call, the system prompts the user to proceed with the call 1343, and the system lets the conversation proceed 1345. While the conversation takes place, the system checks for the occurrence of events. When an event is detected 1346, the system reacts as follows.

If a 3-way call is initiated 1347, the system checks 1353 the control files to determine whether recordings are to be made for such calls. If not, it returns to step 1345. If so, it starts recording 1352 and returns to step 1345.

If the user hangs up 1348, the system returns to step 1308.

If there are only 60 seconds remaining in the time limit for this call or for this number 1349, the user is so informed 1354 and the system returns to step 1345.

If there are only 15 seconds remaining in the time limit for this call or for this number 1350, the user is so informed 1355 and the system returns to step 1345.

If the time limit is reached for this call or for this number 1351, the system cuts off the call, returning to step 1308. Optionally, if the system detects that the user is dialing digits 1357, the system can cut off the call, returning to step 1308.

Referring now to FIG. 3A, there is shown a Main Screen 300 for the system, as it would appear on display screen 113. Main Screen 300 includes the following information about the telephone lines:

- Ln 301: The line number.
- Status 302: The current operational state of a telephone call. For example, when INSTRUCT is displayed, the system is playing a voice prompt instructing the calling party to dial zero plus the number he or she wishes to call (step 1310 in FIG. 13). When ASK NAME is displayed, the system is asking the calling party to state his or her name (step 1329). When GET NAME is displayed, the system has asked the calling party to state his or her name and is now waiting for the recording of the name to complete (between steps 1329 and 1330). When THANKS is displayed, the system is playing a message saying "Thank you for using Gateway Technologies" (step 1343).

- Number 303: The ten-digit number being called. If only seven digits were dialed, the system prefixes the number with the local area code.
- Zone 304: The physical location of the telephone connected to the line.
- Time 305: The elapsed time of the call.

Referring now to FIG. 3B, there is shown a Secondary Screen 311 for the system, as it would appear on display screen 113. The user can switch between the two screens at will. Secondary Screen 300 includes the following information about the telephone lines:

- Ln 301: The line number.
- Current state 306: Equivalent to status 302 shown in FIG. 3A.
- Calls 307: The total number of calls attempted from the telephone.
- Okay 308: The number of accepted calls made from the telephone.
- Deny 309: The number of calls that were completed but denied by the called party.
- Bad 310: The number of calls that were attempted but not completed for some reason. Includes busy signals, no answer, and the like.

System Parameter File 1109 The System Parameter File 1109 specifies configuration and operational parameters relevant to the operation of GWMAIN.EXE 1101. The system administrator uses support program SYSFILE.EXE 1102, also known as the System Parameter File Editor, to supply configurations and parameters to be stored in the System Parameter File 1109. Entry screens for the System Parameter File Editor are shown in FIGS. 4A and 4B. The following is a description of each of the items stored in the System Parameter File 1109:

The System Parameter File

The GWMAIN.EXE program uses several files to determine its configuration and operational parameters. The System Parameter File, and it's associated editor SYSFILE.EXE contain parameters that pertain to the overall system. The System Parameter File Editor uses two screens of prompts to accumulate the necessary parameters for proper system operation.

System ID

This parameter is used by the system in naming the Call Detail Record (CDR) files. A new CDR file is created using the Year, the Site ID, and the day of the year each 24 hours. (For example, a Site named TSTOA would have a CDR file named 92TSTOA. 180 for Jun. 29, 1992.)

Site Name

This parameter contains the Site Name and is used to print the report headers on reports generated by the AWS-4000. It is also displayed on the secondary screen for GWMAIN.EXE.

System PW

The System Password is used to protect sensitive portions of the system from unauthorized use.

Lines.

This parameter is used to tell the system how many active lines are to be installed. If a system is using nine lines of an available twelve lines, setting this parameter to '9' will cause the system to display IDLE on lines 10, 11 and 12 rather than the usual ON-HOOK on the GWMAIN.EXE primary screen.

Callback #

This number is used by the internal alarm system (if activated) as the number to call if an emergency call is placed. This would normally be the Administration Office where the AWS-4000 is located.

Debug Disp

Setting this parameter to 'Y' will display various debug information on the screen while the system is running. You may be requested to turn on this feature by Gateway Support Personnel if you are having problems with your system. You may also activate the Debug Display by press F8 on the console or monitoring workstation keyboard.

Debug Write

Setting this parameter to 'Y' will write various debug information to a file that can be processed by Gateway Technologies, Inc. to determine what is causing a problem with your system. You may be requested to turn this feature on by a Gateway Support technician. You may also activate this feature by pressing Alt-F8 on the console or monitoring workstation keyboard.

Time Slice Ticks

This parameter determines the maximum amount of time the multi- tasking kernel will allow for a process before placing it on hold an letting other processes run. This value is in CPU clock ticks and should not be modified except under instruction from Gateway Technologies, Inc. It's default value is 20.

DTMF Interdigit

This parameter determines the amount of time between DTMF digits when the system is dialing out. The default value is 5 and it should not be changed without specific instructions from Gateway Technologies, Inc.

DTMF Duration

This parameter defines the length of time, in 10 millisecond increments, that a DTMF tone sounds. This option is only active on out-bound dialing, it's default is 10 (100 ms) and it should not be changed without specific instructions.

Ring On Detect

This parameter is the length of time, in 10 millisecond increments, that the system will use to determine that ring voltage is present on the telephone line. The default value is 3 (30 milliseconds) and should not be changed.

Ring Off Detect

This parameter is the length of time, in 10 millisecond increments, that the system will use 3 determine that ring voltage has disappeared on the line. The default is 5 (50 ms) and should not be changed.

Off-hook Delay

The off-hook delay is the amount of time between the time you request the Dialogic Card to take the phone off-hook and the time an off-hook event is generated by the system. This value allows the relays to debounce and prevents problems during call processing. The default value is 50 (500 ms) and should not be changed.

Silence Debounce

This value, in 10 millisecond increments, is the amount of time at the end of a possible silence period that is ignored in determining whether a silence period has actually occurred. The default value is 4 (40 ms) and should not be changed.

LC Off Time

This value, in 10 millisecond increments, is the length of time that Loop Current must be absent before the system returns a Loop Current Drop event. The default is −1, which sets the detection to the smallest possible value (<10 ms). However, typical installation values range from 10 (100 ms) to 60 (600 ms) depending on the local Central Office and what type of telephone interface boards are installed in the CPS-4000. This value should be tested at installation to determine the correct setting.

PD Max Make

This setting controls the maximum length of time a pulse dial pulse is allowing loop current to flow. It is not currently used in any CPS-4000 system. The default value is 50 (500 ms) and should not be changed.

PD Min Make

This setting controls the minimum length of time a pulse dial digit will allow loop current to flow. It also is not currently used in any CPS-4000 system. The default value is 2 (20 ms) and should not be changed.

PD Interdigit

This value controls the maximum interdigit timing on pulse dialing. It is not currently used on any CPS-4000 system. The default is 15 (150 ms) and should not be changed.

PD Min Break

This value is the minimum interdigit timing on pulse dialing. It is not currently used on any CPS-4000 system. The default is 2 (20 ms) and should not be changed.

Ring Reset

This value is the length of time between possible ring detection and a second ring detection where the first possible ring is dropped from consideration. The default value is 80 (800 ms) and should not be changed.

Local Area Code

This is the local area code. It is appended internally by the system to all seven digit dialed numbers for lookup in the NUMBER File for verification, since all numbers are stored in the Number File as ten digit phone numbers.

Maximum Name Record

This value is the length of time allowed for an inmate to record his name. The default value is 3 seconds and probably should not be changed. Do not set this value to less than 2 seconds since the timing is plus or minus 1 second.

Allow Phone Testing

Setting this parameter to 'Y' will allow you to go to an inmate phone, dial 123456789 and have the system dial the local Central Office and record the outside line number. It will then play back the outside line number. The default value is 'N' and should only be changed during installation of the system. This feature is for diagnostic purposes only!

Beep on Drop

This parameter will turn on a beeping tone if the phone is left off hook. It is currently not used on any CPS-4000 system and should not be changed.

Beep Dialing

Setting this field to 'Y' will turn off call progress monitoring and activate the call progress prompts, i.e. the line was busy, etc.

Outside Line Numbers

These fields contains the outside line numbers of each inmate phone line. You must fill out all AVAILABLE lines or the GWMAIN.EXE program will not un. These numbers are used during the billing process so it is important that they be correct.

Local Dialing Prefix

This field is used to store a dialing prefix that is necessary for all local calls (dialed seven digits and marked local in the NPANXX file, see below). This number is prepended to each local call. For example, if the phone lines are behind a PBX that requires that a '9' be dialed before an outgoing number, you would put a '9' in this field.

Intralata Dialing Prefix

This field is used to store a dialing prefix for all Intralata calls (dialed seven digits but not marked local in the NPANXX file, see below). This number is prepended to each intralata call.

Long Distance Dialing Prefix

This field is used to store a dialing prefix for all Long Distance calls (dialed ten digits). This number is prepended to all Long Distance calls. For example, if you want to route all calls through AT&T, you would place 102881 in this field. If you want to use the designated carrier, place a '1' in this field.

System Start Time

This field is the time the system will begin to allow phone calls. The System Start Time is stored in military format (00:00–23:59) and overrides any values in the Channel Parameter File (see below). The default start time is midnight (00:00).

System Stop Time

This field is the time the system will stop allowing phone calls. It is stored in military time format and overrides any values in the Channel Parameter File (see below). The default stop time is midnight (24:00).

Recycle Time

This field is the time, in military format, that the system will reboot each day. If you have an AWS-4000 system, you will want this value to remain at 00:00 (do not reboot), otherwise the standard value is 03:00 (3:00 A.M.).

Message # for 1st Branding
Currently not used

Message # for 2nd Branding
Currently not used

Message # for Identification
Currently not used

Message # for Location
Currently not used

Language Support
First-English, Second-Spanish, Third and Fourth-Optional other languages Maximum Attempts/Number/Day
The maximum number of call attempts allowed in one day before the number is automatically blocked by the system. Default is 50. This field has been replaced by the Fraud Control File and is currently not used.

Allow Person/Person Collect
Setting this field to 'Y' turns on the Person-to-Person collect calling for the entire system.

Line Locations
These fields are displayed on the GWMAIN.EXE primary screen as Zone and are only used for administration information.

Channel Parameter File 1110
The Channel Parameter File 1110 specifies operational parameters for each individual telephone line. The system administrator uses support program CHNFILE.EXE 1103, also known as the Channel Parameter File Editor, to supply parameters to be stored in the Channel Parameter File 1110. Entry screens for the Channel Parameter File Editor are shown in FIGS. 5A, 5B, 5C, and 5D. The following is a description of each of the items stored in the Channel Parameter File 1110:

The Channel Parameter File
The Channel Parameter File is used to set parameter that apply to a specific telephone line. While there are a tremendous number of parameters available on a line per line basis, only a few are ever modified. The Channel File Parameter editor CHNFILE.EXE uses four screens of interactive prompts to build each channel's parameters.

Channel Number
This parameter is the line number you are modifying. Value may range from '1' to '24'.

Time Limit
This is time, in seconds, that you are allowing a call to continue. The default value is 900 seconds (15 minutes). Other common values are 3600 seconds (1 hour) and 1800 seconds (½ hour).

ID System
Setting this value to 'Y' turns on the base Gateway Restricted ID (GRID) system, requiring an inmate to enter an ID before making a call, but not requiring Administration Approved phone numbers.

Full
Setting this value to 'Y' activates the full Gateway Restricted ID (GRID) system, requiring an inmate to enter an ID before making a call and requiring that Administration Approved phones numbers be available before allowing a call Pulse Detect
Setting this value to 'Y' activates the pulse detection feature of the CPS-4000, allowing the called party to accept a collect call using a pulse dial phone. Setting this value to 'N' will only allow DTMF capable phones to accept CPS-4000 generated calls. The default is 'Y' and should not be changed.

Passive Accept
Making this field a 'Y' allows all calls from the CPS-4000 to be accepted without active acceptance by the called party. The default value is 'N' and should not be changed.

Start
This is the time that this channel will begin to allow phone calls. It is overridden by the value in the System Start Time in the System Parameter File (see above). It is in military time.

Stop
This is the time that this channel will stop allowing phone calls. It is overridden by the value in the System Stop Time in the System Parameter File (see above). It is in military time format.

DTMF Detection Time
This value is the length of time a DTMF tone must be present to be detected by the channel. The default value is 5 (50 ms) and should not be changed.

DTMF Edge Event
This value can be either '1' or '2'. A '1' signifies that the DTMF tone is detected on the leading edge of the tone (which may cause large numbers of false detects) and a '2' signifies that the DTMF tone is detected on the trailing edge (which may show up in recordings). The default for the CPS-4000 is '2' and should not be changed.

DTMF Receive Guard Time
This value is used to guard against false DTMF detection. The default value is '0' and should not be changed.

Commissary Active
This field is used to turn on/off commissary access for the specified line.

Silence Compression Delay
This value is the length of time in milliseconds that a silent period must exist before it is compressed by the system. The default value is 200 and should not be changed.

Number of Rings before No Answer
This field is the number of rings that the system will wait before returning a "No Answer" event. The default is '4' but typical values range from '4' to '6'.

Delay before Call Analysis Begins
This is length of time, in 10 millisecond increments, that the system waits after completing dialing before beginning call analysis, which determines whether the phone was busy, rang with no answer, detected an intercept tone, etc. The default value is 25 (250 ms) and should not be changed.

Time out delay on no signal

This is the number of milliseconds the system will wait during call analysis if there is no detectable signal before returning a No Ringback event. The default value is 4000 and should not be changed.

Delay before LC drop is a connect

This value is the length of time after a Loop Current drop has been detected before the system will return an Answered event. The default value is −1 (disabled) and should not be changed.

Delay before returning a LC drop

This is length of time after a loop current drop has been detected before the system returns a loop current drop event. The default is 10 (100 ms) and should not be changed.

Return Connect on leading edge

This parameter determines whether the Loop Current drop is returned on the leading edge (1) or trailing edge (2) on a connect. Since the CPS-4000 does not use loop current drop to determine connect this value is not actually used. The default is 2 and should not be changed.

Time out for continuous signal

This is the amount of time the call analysis will wait if a continuous signal is present (outside line is bad) before returning a No Ringback Event. The default is 650 ms and should not be changed.

Tolerance above 1st low

This is the percentage amount of acceptable deviation allowed for the short low signal. The default is 13 and should not be changed.

Tolerance below 1st low

This is the percentage amount of acceptable deviation allowed below for the short low signal. The default is 13 and should not be changed.

Tolerance above 2nd low

This is the percentage amount of acceptable deviation allowed above for the long low signal. The default is 13 and should not be changed.

Tolerance below 2nd low

This is the percentage amount of acceptable deviation allowed below for the long low signal. The default is 13 and should not be changed.

Tolerance above high

This is the percentage amount of acceptable deviation allowed above for the high signal. The default is 13 and should not be changed.

Tolerance below high

This is the percentage amount of acceptable deviation allowed below for the high signal. The default is 13 and should not be changed.

Max time for 1st low to detect busy

This is the maximum time in 10 millisecond increments allowed for the short low on a busy signal. The default is 90 (900 ms) and should not be changed.

Max time for 2nd low to detect busy

This is the maximum time in 10 millisecond increments allowed for the long low on a busy signal. The default is 90 (900 ms) and should not be changed.

Max time for high to detect busy

This is the maximum time in 10 millisecond increments allowed for the high signal on a busy signal. The default is 90 (900 ms) and should not be changed.

Number of additional states before busy

This is number of additional cycles that the system must detect on a busy signal before returning a busy event. The default is 0 and should not be changed.

Smallest silence Interval

This is the smallest interval of silence that the system will accept as a silent event. The default is 15 (150 ms) and should not be changed.

Smallest sound Interval

This is the smallest interval of sound that the system will accept as a no-silence event. The default is 19 (190 ms) and should not be changed.

Max time for short low detected as double ring

This is the maximum time for the short low period if this is to be detected as a double ring. The default is 90 (900 ms) and should not be changed.

Min time for long low detected as double ring

This is the minimum time for the long low period if the signal is to be detected as a double ring. The default is 225 (2250 ms) and should not be changed.

Enable Operator Intercept Detection

Placing a 'Y' in this field will enable Special Intercept Tone (SIT) detection. The default is 'Y' and should not be changed.

Min Intercept duration for detection

This is the minimum length of time the SIT tone must be present before being detected as a SIT tone. The default is 10 (100 ms) and should not be changed.

Silence Trailing Edge Debounce

The minimum amount of silence that will be recorded if silence compression recording is being used. The default is 0 and should not be changed.

High Size

This value is checked against the length of the high period to determine which low maximum to use. The default is 90 (900 ms) and should not be changed.

Low Max A

Maximum low period before connect if length of high period>high size. The default is 700 (7000 ms) and should not be changed.

Low Max B

Maximum low period before connect if length of high period<high size. The default is 530 (5300 ms) and should not be changed.

Begin Call Analysis on Ring Number

The ring number you wish call analysis to begin. The default is 1 and should not be changed.

High ceiling

Maximum length of high period if retraining is required. The default is 78 and should not be changed.

Low ceiling

Maximum length of short low period if retraining is required. The default is 58 and should not be changed, Low allowed frequency The lower boundary in hertz for frequency detection. The default is 900 and should not be changed.

High allowed frequency

The upper boundary in hertz for frequency detection. The default is 1000 and should not be changed.

Min time within frequency for detect

The minimum amount of time the signal must be within the specified frequencies before SIT detection event is generated. The default is 5 (50 ms) and should not be changed.

Bad signal reject percentage

This is the percent of time the signal frequency can be outside of the boundaries and still be detected. The default is 20 and should not be changed.

Max answer duration

The length of time before a connect is assumed if no other event is generated. The default is 1000 (10000 ms) and should not be changed.

Silence deglitching value

The minimum amount of silence required before sound is considered an answer event. The default is 60 (600 ms) and should not be changed.

You will need to complete a Channel Parameter File record for each channel used in the CPS-4000.

Number Control File NUMBER.DTA 1127

The Number Control File stores information regarding every number that has been called. It is also used for blocking and unblocking particular numbers, allowing passive acceptance of specific numbers, or triggering alarms and/or recordings when particular numbers are called. The system administrator uses support program NUMBER.EXE 1128 to supply information regarding each number. An entry screen is shown in FIG. 6. The following is a description of each of the items in the Number Control File:

The Number Control File

The Number Control File is used to store every number that has been called through the CPS-4000 system. It is also used for blocking and unblocking numbers, allowing passive acceptance to specific numbers, alarming and recording calls. The Number Control File is at the very heart of the CPS-4000 system.

Number

The ten digit telephone number.

Date Last Verified/Changed

The date of the last time this record was modified.

Verified/Changed by

The initials of the last person to modify this record.

Count Since Changed/Verified

The number of call attempts to this number since the last manual change to this record.

Count Since Reset

The number of call attempts to this number since the Maximum calls/Number/Day limit has been reached and reset.

Allow Passive Accept

Whether this number is allowed to use passive accept.

Block Code

This is block code used by the system. The usual block codes are either UOK if you want to allow calls to the number or HBL if you want to block calls to the number. You may also use FRE for free calls, or SPL to splash calls to the local operator.

Dialing Instructions

This field is used if you want to have special dialing instructions for a specific number. This field is prepended to the number before dialing.

Local Call

Normally, local calls are determined in the NPANXX file (see below). However, if a call is to be dialed 0+7, or if you have special dialing instructions, you will need to set this field to 'Y' if the number is a local call.

Record Calls to This Number

Setting this field to 'Y' will record all calls made to this number.

Alarm Calls to This Number

Setting this field to 'Y' will cause an alarm to sound at the CPS-4000 when a call is made to this number.

Attempt Counter

This field is used by the CPS-4000 to track the number of call attempts made to this number. It should not be changed.

Accept Counter

This field is used by the CPS-4000 to track the number of accepted calls made to this number. It should not be changed.

Time Counter

This field is used by the CPS-4000 to track the number of seconds of talk time made to this number. It should also not be changed.

Attempt Date

The date of the first attempt made to this number after the last rollover date. It is filled in by the CPS-4000 and should not be changed.

Accept Date

This is the date of the first accept after the last rollover date. It is also filled in by the CPS-4000 and should not be changed.

Time Date

This field is filled in by the CPS-4000 and should not be changed. It is the date of the first accept after the last rollover date.

Attempt Override

Setting this flag to 'Y' will de-activate the attempt tracking feature of the CPS-4000. Normally, this is left as 'N'.

Accept Override

Setting this flag to 'Y' will de-activate the accept tracking feature of the CPS-4000.

Normally, this is left as 'N'.

Time Override

Setting this flag to 'Y' will de-activate the time tracking feature of the CPS-4000.

Normally, this is left as 'N'.

NPANXX Control File NPANXX.DTA 1115

The NPANXX Control File NPANXX.DTA 1115 stores information regarding area codes and telephone exchanges. It permits blocking and unblocking exchanges, selection of particular exchanges where all calls are local calls, and the like. The system administrator uses support program NPANXX.EXE 1108 to supply information regarding each exchange. An entry screen is shown in FIG. 7. The following is a description of each of the items in the NPANXX Control File 1115:

The NPANXX Control File

The NPANXX Control File is used to block complete NPANXX's, to select NPANXX's where all calls are local calls, to select NPANXX's where all calls need to be passive (for example, the NPANXX does not support touch tone dialing). Please remember that blocking, free calls, and passive fields set in this file will apply to a whole area code and exchange.

NPANXX

The six digit NPANXX (Area code+Exchange).

Date Last Verified/Changed

The date of the last time this record was modified.

Verified/Changed by

The initials of the last person to modify this record.

Passive Accept

Setting this field to 'Y' allows all calls to this NPANXX to be accepted passively.

Block Code

This is block code used by the system. The usual block codes are either UOK if you want to allow calls to this NPANXX or HBL if you want to block calls to this NPANXX. You may also use FRE for free calls, or SPL to splash calls to the local operator. Note that this applies to the WHOLE NPANXX.

Dialing Instructions

This field is used if you want to have special dialing instructions for a specific NPANXX. This field is prepended to the number before dialing.

Local Call

You will need to set this field to 'Y' if the NPANXX is a local call.

NPA Control File NPA.DTA 1112

The NPA Control File NPA.DTA 1112 stores information regarding telephone area codes. It permits blocking and unblocking area codes, allowing free calls in certain area codes, and the like. The system administrator uses a support program NPA.EXE 1105 to supply information regarding each exchange. An entry screen is shown in FIG. 8. The following is a description of each of the items in the NPA Control File 1112:

The NPA ControlFile

The NPA Control File is used for blocking, allowing free calls or allowing passive calls to an entire area code. Please be sure you want to make changes for the entire area code before making changes to this file.

NPA

The three digit NPA (Area code).

Date Last Verified/Changed

The date of the last time this record was modified.

Verified/Changed by

The initials of the last person to modify this record.

Passive Accept

Setting this field to 'Y' allows all calls to this NPA to be accepted passively.

Block Code

This is the block code used by the system. The usual block codes are either UOK if you want to allow calls to this NPA or HBL if you want to block calls to this NPA. You may also use FRE for free calls, or SPL to splash calls to the local operator. Note that this applies to the WHOLE NPA.

Dialing Instructions

This field is used if you want to have special dialing instructions for a specific NPA. This field is prepended to the number before dialing.

NXX Control File NXX.DTA 1113

The NXX Control File NXX.DTA 1113 stores information regarding particular exchanges in all area codes. The system administrator uses support program NXX.EXE 1106 to supply information regarding the NXX to be blocked. An entry screen is shown in FIG. 9. The NXX control file contains three fields for each record: the NXX to be blocked, the date of last modification of the record, and the initials of the person who last modified the record.

Fraud Control Parameter File 1114

The Fraud Control Parameter File 1114 is used to set restrictions on inmate calling patterns to reduce fraudulent use of the telephone system. The system administrator uses support program CTLFILE.EXE 1107 to set parameters regarding calling patterns. An entry screen is shown in FIG. 10.

In the preferred embodiment, the Fraud Control Parameter File 1114 allows the system administrator to specify a number of local and/or long distance calling pattern parameters. Each such parameter specifies an amount field, a period field, and a roll-over field. The amount field specifies the maximum number of calls permitted (if set to zero, the parameter is disabled). The period field specifies the time period for measuring the maximum number of calls (i.e., daily, weekly, or monthly). The roll-over field specifies when successive time periods will begin (i.e., on a particular day of the week or a particular day of the month).

File 1114 stores the above information with respect to the following: the number of call attempts that will be allowed to a specific number; the number of accepted calls that will be allowed to a specific number; and the number of minutes of conversation that are allowed for a specific number. Once any of these parameters are exceeded for a specific number, the system can either block future calls or supply a trigger for recording future calls. The system administrator may specify which action is taken when a parameter is exceeded. This information is stored in Number Control File NUMBER.DTA 1127 and ID Files 1111. Recording may also be triggered if a 3-way call or call forwarding attempt is detected, as described above in connection with the discussion of GWMAIN.EXE.

Control files 1112–1115 specify parameters that may be applied to call blocking or call monitoring. Thus, for example, Fraud Control Parameter File 1114 may indicate that, after a certain number has been called a given number of times, the system will record all subsequent calls to that number. Alternatively, File 1114 may specify that all subsequent calls to that number may be blocked. Thus, the present invention provides improved flexibility for the system administrator to specify how certain types of calls should be handled.

What is claimed is:

1. A telephone system for selectively blocking or recording outgoing telephone calls, comprising:

a parameter input device for specifying one or more block parameters to identify unauthorized calls and one or more record parameters to identify calls for recording;

a processor coupled to the input device and to a telephone line of the telephone system, the processor including a control program for continuously monitoring the telephone line for call parameters and comparing the specified block and record parameters with detected call parameters;

switching means coupled to the processor, the telephone line, and outside telephone lines for blocking an outgoing telephone call when a detected call parameter matches a specified block parameter; and a recording device coupled to the processor for recording conversations on the telephone line when a detected call parameter matches a specified record parameter and no detected call parameter matches a specified block parameter.

2. The system of claim 1, wherein each specified parameter is a call parameter that is generated by a triggering event.

3. The system of claim 2, wherein the triggering event is usage of a specified telephone line.

4. The system of claim 2, wherein the triggering event is an attempt to dial a specified telephone number.

5. The system of claim 2, wherein the triggering event is a telephone call having a length exceeding a predefined amount of time.

6. The system of claim 2, wherein the triggering event is an attempt to use a specified telephone feature.

7. The system of claim 6, wherein the specified telephone feature is three-way calling.

8. The system of claim 6, wherein the specified telephone feature is call-forwarding.

9. The system of claim 1, further comprising counting means coupled to the processor for counting a number of occurrences of a specified event on the telephone line, wherein a specified record parameter comprises a specified number of occurrences of the specified event.

10. The system of claim 9, wherein the specified event is an attempted call to a specified number.

11. The system of claim 9, wherein the specified event is a completed call to a specified number.

12. The system of claim 9, wherein the control program monitors the telephone line for a user ID and the specified event is the detection of an ID of a specified user.

13. The system of claim 1, further comprising a storage device coupled to the recording device for storing recorded conversations.

14. The system of claim 13, further comprising an access device coupled to the storage device for selectively accessing stored conversations.

15. The system of claim 13, wherein the storage device stores recorded conversations in a digitized format.

16. The system of claim 1, further comprising counting means coupled to the processor for counting a number of occurrences of a specified event on the telephone line, wherein a specified block parameter comprises a specified number of occurrences of the specified event.

17. The system of claim 16, wherein the specified event is the detection of an attempted call to a specified telephone number.

18. The system of claim 16, wherein the control program monitors the telephone line for a user ID and the specified event is the detection of an ID of a specified user.

19. A computer-implemented process for selectively blocking or recording outgoing telephone calls, comprising the steps of:

specifying block and record parameters for identifying outgoing telephone calls to be blocked or recorded, respectively;

continuously monitoring an outgoing telephone call for call parameters generated by the outgoing telephone call;

comparing the specified block and record parameters with detected call parameters;

blocking the outgoing telephone call when a detected call parameter matches a specified block parameter; and recording the outgoing telephone call when a detected call parameter matches a specified record parameter and no detected call parameter matches a specified block parameter.

20. The computer-implemented process of claim 19, wherein each specified parameter is a call parameter that is generated by a triggering event.

21. The computer-implemented process of claim 19, further comprising the step of counting a number of occurrences of a specified event on a telephone line, wherein the step of specifying a record parameter comprises the substep of specifying a number of occurrences of the specified event.

22. The computer-implemented process of claim 19, further comprising the step of storing the recording of the telephone call in a digitized format.

23. The computer-implemented process of claim 22, further comprising the steps of:

accepting a request to play back a recorded telephone call; and playing back the requested telephone call.

24. The computer-implemented process of claim 19, further comprising the steps of:

digitizing the recorded telephone call; and storing the digitized telephone call.

25. The computer-implemented process of claim 24, further comprising the steps of:

storing descriptive information regarding the recorded telephone call; and selectively displaying the stored descriptive information.

* * * * *